(12) United States Patent
Zhan et al.

(10) Patent No.: US 11,509,516 B2
(45) Date of Patent: Nov. 22, 2022

(54) MIMO-OFDM WIRELESS SIGNAL DETECTION METHOD AND SYSTEM CAPABLE OF CHANNEL MATRIX PRE-PROCESSING DURING DETECTION

(71) Applicant: ESPRESSIF SYSTEMS (SHANGHAI) CO., LTD., Shanghai (CN)

(72) Inventors: Rui Zhan, Shanghai (CN); Lu Kong, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/434,899

(22) PCT Filed: Dec. 3, 2019

(86) PCT No.: PCT/CN2019/122736
§ 371 (c)(1),
(2) Date: Aug. 30, 2021

(87) PCT Pub. No.: WO2020/173161
PCT Pub. Date: Sep. 3, 2020

(65) Prior Publication Data
US 2022/0060365 A1    Feb. 24, 2022

(30) Foreign Application Priority Data

Feb. 28, 2019    (CN) .......................... 201910152084.3

(51) Int. Cl.
*H04L 27/26* (2006.01)
*H04L 27/34* (2006.01)
(Continued)

(52) U.S. Cl.
CPC ...... *H04L 27/2695* (2013.01); *H04L 27/2691* (2013.01); *H04L 27/3483* (2013.01); *H04B 7/0413* (2013.01); *H04L 5/001* (2013.01)

(58) Field of Classification Search
CPC . H04L 27/2695; H04L 5/001; H04L 27/2691; H04L 27/3483; H04B 7/0413
See application file for complete search history.

(56) References Cited

U.S. PATENT DOCUMENTS

2008/0279298 A1* 11/2008 Ben-Yishai ....... H04L 25/03242
375/261

FOREIGN PATENT DOCUMENTS

| EP | 2458747 A1 | 5/2012 |
| WO | WO 2012/1556096 A1 | 11/2012 |

OTHER PUBLICATIONS

International Search Report from WO 2020/173161 A1 dated Feb. 24, 2020.
(Continued)

*Primary Examiner* — Rahel Guarino
(74) *Attorney, Agent, or Firm* — Aird & McBurney LP

(57) ABSTRACT

A signal detection method for a MIMO-OFDM wireless communication system includes obtaining a channel matrix of each subcarrier for each MIMO-OFDM data packet; receiving a reception vector of each subcarrier; performing MIMO detection for a first OFDM symbol and channel matrix preprocessing to generate a global dynamic K-value table; performing MIMO detection for each subsequent OFDM symbol, the MIMO detection includes: performing the following steps for each subcarrier of a current OFDM symbol: transforming the reception vector of the current subcarrier into a LR search domain; and obtaining a LR domain candidate transmission vector of the current subcarrier, a K-value applied to each search layer of the current subcarrier during the K-best search is a global dynamic (Continued)

K-value in the global dynamic K-value table corresponding to the search layer.

20 Claims, 13 Drawing Sheets

(51) Int. Cl.
*H04B 7/0413* (2017.01)
*H04L 5/00* (2006.01)

(56) References Cited

OTHER PUBLICATIONS

Office Action and Search Report from corresponding Chinese Application No. 201910152084.3 (Publication No. CN111628952) dated Feb. 5, 2021.
Utilization of lattice reduction technique in MIMO detection-cited in Chinese Office Action dated Feb. 5, 2021 (with EN abstract).
KR101949031B1 cited in ISR (with EN cover page).
CN111628952B CN Priority (with EN cover page).
CN105814857 cited in ISR (with EN cover page).
CN103997474A cited in Chinese Office Action dated Feb. 5, 2021 (with EN cover page).
CN101917368A cited in ISR (with EN cover page).

* cited by examiner

✕  LRA MMSE SIC evaluation value

MIMO-OFDM WIRELESS SIGNAL DETECTION METHOD AND SYSTEM CAPABLE OF CHANNEL MATRIX PRE-PROCESSING DURING DETECTION

TECHNICAL FIELD

The present disclosure mainly relates to a low-complexity detection technology for a Multiple-Input Multiple-Output (MIMO) wireless communication system, specifically to a MIMO-OFDM wireless signal detection method and system with channel matrix preprocessing during detection.

BACKGROUND ART

With a rapid development of wireless communication technology, Multiple-Input Multiple-Output (MIMO) technology has been applied in more and more wireless communication systems, to spread frequency spectrum utilization, increase data rate and obtain a higher diversity gain to improve reliability of system data transmission. In particular, with evolution of wireless communication theory, the number of antennas used in new MIMO wireless communication technology is becoming or will become bigger and bigger. Meanwhile, a user equipment is becoming smaller and smaller in size, and the integration level is becoming higher and higher. This makes research on high-performance detection methods for MIMO signals very meaningful. On the one hand, complexity of the detection method needs to be controllable to ensure large throughput of system data; on the other hand, requirements for low power consumption and low area for design and implementation of Very Large Scale Integrated Circuits (VLSIs) should be met.

MIMO detection methods can be divided into optimal detection, suboptimal detection and near-optimal detection by detection performance.

Common MIMO optimal detection methods, such as maximum likelihood (ML) detection, can result in optimal bit error detection performance, but its detection complexity increases exponentially with increase of the number of QAM constellations and antennas. Therefore, under most system configurations, the optimal detection is not practical and only serves as a reference for performance comparison of other MIMO detectors in simulation.

MIMO suboptimal detection methods can be further divided into linear and nonlinear suboptimal detection methods. The linear suboptimal detection methods, such as Zero Forcing (ZF) and Minimum Mean Square Error (MMSE), use linear equalization to process all parallel data streams at one time with lowest complexity and low system overhead. However, since its Receiver Diversity Gain (RDG) is close to that of Single-Input Single-Output (SISO) systems, the bit error performance is the worst. The nonlinear suboptimal detection methods, such as various forms of Successive Interference Cancellation (SIC) methods, show slight increase in the RDG, but are susceptible to error propagation and have a limitation of improvement in the bit error performance. In terms of performance, the nonlinear suboptimal detection methods, when being performed on a large scale of antennas and in a large constellation size, are significantly different from the ML detection.

The MIMO near-optimal detection methods usually refer to various tree search algorithm variants based on Sphere Decoder (SD). Such algorithms can make the detection performance close to that of the ML method, and its complexity is much lower than that of the ML method. Among them, a breadth-first K-best detector can ensure a throughput independent of Signal to Noise Ratio (SNR) of signal reception, and that the performance is close to that of the ML detection. Therefore, the breadth-first K-best detector is one of the most common MIMO detection methods. A tradeoff between the detection performance and the complexity is achieved by adjusting a K-factor in K-best.

However, for a simple K-best detection, when being performed on a large scale of antennas and in a large constellation size, search K-value must be increased to ensure a certain reception performance. As a result, the complexity increases rapidly, and the performance decreases rapidly compared with that of the ML detection. It is impossible to achieve the tradeoff between the MIMO reception performance and its complexity simply by adjusting the K-factor.

In the meantime, in a practical wireless communication system, the MIMO technology is not used alone, but usually used in combination with other wireless communication technologies, such as Orthogonal Frequency Division Multiplexing (OFDM, Multilevel Quadrature Amplitude Modulation (M-QAM), advanced channel codecs (e.g., Low-Density Parity Check (LDPC) code, Turbo code, Convolutional Code (CC)), to further improve the system performance and the frequency spectrum utilization and withstand non-ideal conditions of wireless channels.

For example, WLAN 802.11n/ac/ax defined by IEEE in recent years, the fourth generation wireless communication system 'LTE' defined by 3GPP, and the upcoming 3GPP fifth generation wireless communication system are typical examples of the MIMO technology combined with the OFDM, high order M-QAM and the advanced channel coding and decoding technology.

Such systems pose new challenges to the design of high-performance MIMO detectors. A key of design idea of such systems is how to comprehensively consider advantages and disadvantages of various technologies, so that all parts work together to achieve optimization of the whole link performance.

However, most of the current technical solutions in the prior art are committed to solving single carrier MIMO detection, while no practical method is given for the case of frequency selective channels such as MIMO-OFDM. In addition, soft value generation required for MIMO detection and channel decoding is not comprehensively considered, and channel coding gain cannot be fully utilized.

The inventors noted that single carrier MIMO detection methods and systems in the prior art had not at least adequately solved the following problems in a MIMO-OFDM environment:

1) optimization after the MIMO detection plus frequency domain dimensions (OFDM); and 2) optimization of an LLR soft value applied to a channel decoder in the MIMO-OFDM detection, that is, reasonable allocation of search resources.

For example, H. Yao and G. Wornell, "Lattice-Reduction-Aided Detectors for MIMO Communication Systems," in IEEE Proc. Globecom, Taipei, Taiwan, Nov. 17-21, 2002, as theoretical foundation work of Lattice Reduction (LR) domain MIMO detection, gives a clear theoretical analysis and physical meaning explanation of LR domain, but provides no specific implementation suggestions.

D. Wubben, R. Bohnke, V Kuhn, and K.-D. Kammeyer, "MMSE-Based Lattice Reduction for Near-ML Detection of MIMO Systems," in ITG Proc. Workshop on Smart Antennas (WSA), Munich, Germany, March 2004, proposes an optimal operation of LR domain transform, but its MIMO detection is based on MMSE, as a result, the detection performance is unsatisfactory.

M. Shabany and G. Gulak, "The application of lattice-reduction to the K-best algorithm for near-optimal MIMO detection," in Proc. IEEE Int. Symp. Circuits Syst., May 2008, pp. 316-319, is the earliest literature that gives K-best MIMO detection methods for the LR domain, but does not take LR domain expansion boundary into account in the algorithm. In the meantime, it is not designed for MIMO-OFDM, and does not take the soft value generation into special consideration.

S. Roger, A. Gonzalez, V. Almenar, and M. Vidal, "On decreasing the complexity of lattice-reduction-aided K-best MIMO detectors," in Proc. Eur. Signal Process. Conf., Glasgow, U.K., August 2009, pp. 2411-2415, gives a K-best detection method with LR domain search boundary, and proposes dynamic adjustment of K, but does not give an optimal preprocessing process, and the process of dynamically adjusting the K-value greatly increases system search resources rather than ensuring that the total amount of resources remains unchanged. At the same time, it aims at neither the frequency selective channel often encountered in the MIMO-OFDM nor optimization of the soft value generation for channel coding and decoding gain.

Chinese patent publication CN105814857A discloses a system and method for detecting symbols in a large Multiple-Input Multiple-Output communication system, and a non-MIMO-OFDM system therein cannot cope with frequency selective fading resulting from a multi-path channel. At the same time, the patent publication neither optimizes the soft value generation, nor maximizes the channel coding and decoding gain. Moreover, the patent publication neither defines boundaries for LR domain search nor maximizes expansion efficiency.

Chinese patent CN103548310B discloses a detection method and receiver based on a Multiple-Input Multiple-Output antenna communication system. Even though this disclosure uses LR domain detection with two QR decompositions in preprocessing, the processing method is not the most simplified one. In addition, the LR domain search uses depth-first sphere decoding rather than being based on reasonable search boundaries, which results in three consequences: 1) a search range is unreasonable, useless expansions are too many, or useful expansions are insufficient; 2) the search is not expanded on demand and does not use a natural expansion sequence, which requires an additional partial Euclidean distance (PED) sorting module; and 3) as search expansions depend on sphere radius D, it causes that K-value is not fixed and greatly fluctuates with SNR and other factors, which is unfavorable for hardware implementation. In the meantime, the patent is designed for a MIMO single carrier system, rather than a MIMO-OFDM system, and cannot cope with the frequency selective fading resulting from the multi-path channel.

In addition, the search range of a symmetric LR domain is problematic. In practice, the search boundary of the LR domain is hardly symmetric. If the search boundary is directly processed according to the symmetry, the search range will be improperly expanded or narrowed, resulting in serious errors in search detection.

Moreover, improving detection accuracy by expanding the search K-value will directly increase number of search expansions of the system, prolong decoding detection time, and reduces system throughput.

On the other hand, the soft value generation required for the MIMO detection and channel decoding is not comprehensively considered in the prior art, and the channel coding gain cannot be fully utilized. For example, Chinese patent CN101917368B discloses a soft output method for MIMO detection based on lattice reduction, wherein the K-best detection is performed by using the lattice reduction and a sorted list of corresponding LR transform domain signals. However, the patent is also designed for the MIMO single carrier system, and does not provide any optimization for the soft value generation in the case of the frequency selective fading resulting from the multi-path channel in the MIMO-OFDM system.

Therefore, an improved MIMO-OFDM wireless signal detection method and system is needed in the field, which can overcome defects of existing MIMO wireless signal detection methods and systems, especially optimize the frequency selective channel often used in the MIMO-OFDM, dynamically allocate the K-value without increasing the system search resources, and perform soft value generation optimization for the channel coding and decoding gain. It should be understood that the technical problems listed above are only examples rather than restrictions on the present disclosure, and the present disclosure is not limited to the technical solutions for solving all of the above-said technical problems at the same time. The technical solutions of the present disclosure may be implemented to solve one or more of the above-said or other technical problems.

SUMMARY OF THE INVENTION

In view of the above problems, the present disclosure provides a signal detection method and system for a MIMO-OFDM wireless communication system, which is especially suitable for a wireless communication system with channel coding and decoding in a MIMO-OFDM environment. The present disclosure has low complexity and is suitable for a LR-aided and global dynamic K-programming K-best MIMO detector structure and method with stable throughput for a coded MIMO-OFDM wireless communication system.

In one aspect of the present disclosure, a signal detection method for a MIMO-OFDM wireless communication system is provided, and the method includes processing a plurality of MIMO-OFDM data packets. The method includes the following steps:

performing the following steps for each of the plurality of MIMO-OFDM packets:

performing channel estimation to obtain a channel matrix of each subcarrier;

receiving a reception vector of each subcarrier;

performing MIMO detection for a first OFDM symbol in a MIMO-OFDM pack and channel matrix preprocessing for the channel matrix of each subcarrier in the first OFDM symbol to generate a global dynamic K-value table, wherein the channel matrix preprocessing includes performing decomposition and lattice reduction (LR) for the channel matrix of a current subcarrier to generate a plurality of LR domain matrices of the current subcarrier, and wherein the global dynamic K-value table includes a global dynamic K-value corresponding to each search layer of each subcarrier, wherein performing MIMO detection for the first OFDM symbol comprising performing the following steps:

performing a K-best search for the current subcarrier according to a preset fixed K-value or a variable K-value calculated for the current subcarrier, and generating an LR domain candidate transmission vector of the current subcarrier;

performing MIMO detection for each subsequent OFDM symbol in the MIMO-OFDM data packet, in which the MIMO detection includes: performing the following steps for each subcarrier of the current OFDM symbol: reading a plurality of LR domain matrices and a reception vector of the current subcarrier; transforming the reception vector of the current subcarrier into an LR search domain; and performing K-best search for the current subcarrier to obtain an LR domain candidate transmission vector of the current subcarrier, wherein a K-value applied to each search layer of the current subcarrier in the K-best search is a global dynamic K-value in the global dynamic K-value table corresponding to the search layer.

In another aspect of the present disclosure, a signal detection system for a MIMO-OFDM wireless communication system is provided. The system includes a MIMO detector module for detecting a plurality of MIMO-OFDM data packets, and the MIMO detector module includes a channel matrix preprocessing submodule, a storage submodule and a K-best search submodule:

The MIMO detector module receives a channel matrix of each subcarrier obtained by channel estimation and a reception vector of each subcarrier as an input;

The MIMO detector module is configured to perform MIMO detection for a first OFDM symbol in a MIMO-OFDM pack, and the channel matrix preprocessing submodule is configured to perform channel matrix preprocessing for the channel matrix of each subcarrier in the first OFDM symbol to generate a global dynamic K-value table, wherein the channel matrix preprocessing includes performing decomposition and lattice reduction for the channel matrix of a current subcarrier to generate a plurality of LR domain matrices of the current subcarrier, and wherein the global dynamic K-value table includes a global dynamic K-value corresponding to each search layer of each subcarrier, and wherein performing MIMO detection for the first OFDM symbol comprising performing the following steps for each subcarrier of the first OFDM symbol: performing K-best search for the current subcarrier according to a preset fixed K-value or a variable K-value calculated for the current subcarrier, and generating an LR domain candidate transmission vector of the current subcarrier;

The storage submodule is configured to store the global dynamic K-value table and search parameters for each subcarrier;

The K-best search submodule performs MIMO detection for each subsequent OFDM symbol in the MIMO-OFDM data packet, in which the MIMO detection includes performing the following steps for each subcarrier of the current OFDM symbol: reading a plurality of LR domain matrices and a reception vector of the current subcarrier; transforming the reception vector of the current subcarrier into an LR search domain; performing K-best search for the current subcarrier to obtain an LR domain candidate transmission vector of the current subcarrier, in which a K-value applied to each search layer of the current subcarrier in the K-best search is a global dynamic K-value in the global dynamic K-value table corresponding to the search layer.

Compared with the prior art, the method and system proposed in the present disclosure can reasonably allocate K-best search expansion resources according to the overall situation of a transmission channel of a current MIMO system, ensure stable throughput, realize high search expansion efficiency and fewer useless expansions so as to make LLR soft value generation more reasonable and make full use of channel coding and decoding gain. The method and system of the present disclosure are suitable for realizing high-efficiency and high-performance MIMO-OFDM detection through VLSI.

DETAILED DESCRIPTION OF THE PREFERRED EMBODIMENTS

The present disclosure will be more completely described below with reference to the accompanying drawings which form a part of the present disclosure and give exemplary embodiments through illustration. It should be understood that the embodiments shown in the accompanying drawings and described below are merely illustrative and not restrictive on the present disclosure.

Figure 1:
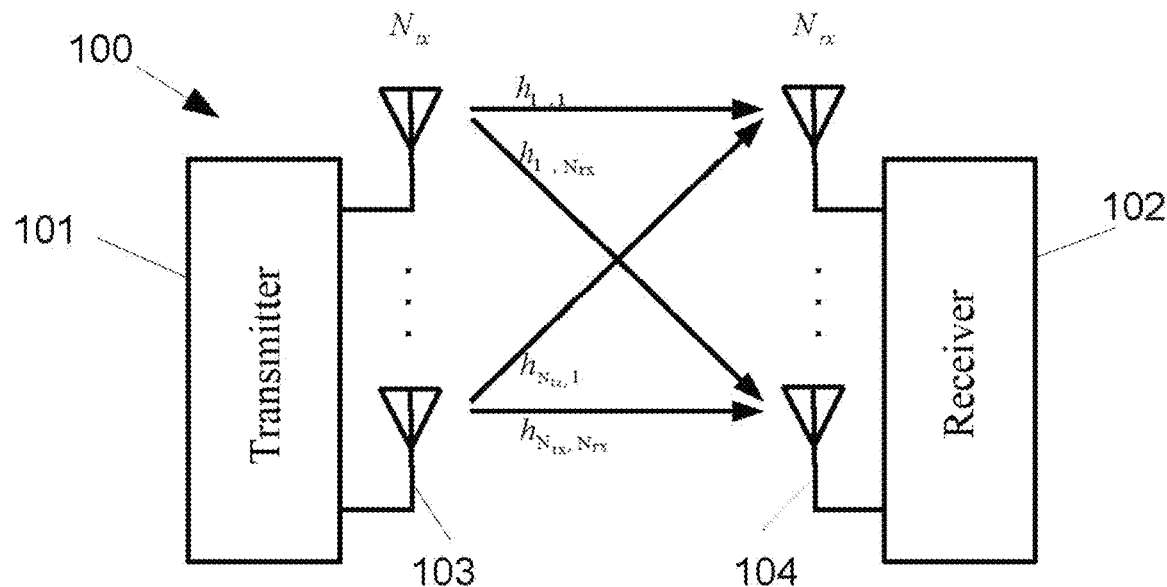
FIG. 1 is a schematic diagram of a general transmission model of a channel of a MIMO system.

FIG. 1 is a diagram of a general transmission model of a channel of a MIMO system. Assuming in a MIMO system 100, the number of transmitting antennas 103 at a transmitter 101 is $N_{tx}$, and the number of receiving antennas 104 at a receiver 102 is $N_{rx}$. The MIMO channel is a quasi-static flat Rayleigh fading channel, dimension of a channel matrix $\overline{H}$ is $N_{rx} \times N_{tx}$, and its elements $h_{i,j}$ are two-dimensional Gaussian random variables with a mean value of zero and a variance of 1.

A tree search detection such as K-best has the best performance when column vectors of the MIMO channel matrix $\overline{H}$ are orthogonal to each other, which is close to the performance of an ML detection. Therefore, performing MIMO detection based on an orthogonal basis is an idea to improve the tree search detection. A current receiving signal vector $\overline{r}$ is taken as a vector in a lattice, and the column vectors of the current channel matrix $\bar{H}$ is taken as a set of basis vectors of the current lattice. In an actual MIMO wireless channel, physical implementation of an antenna array and the scattering of a space environment will cause the basis vectors of $\bar{H}$ to be correlated.

In order to improve detection performance of a MIMO receiver, lattice reduction (LR) is introduced into the design of a MIMO detection algorithm. See the paper of H. Yao and G. Wornell (Lattice-Reduction-Aided Detectors for MIMO Communication Systems" and the paper of D. Wubben, R. Bohnke, V Kuhn, and K.-D. Kammeyer (MMSE-Based Lattice Reduction for Near-ML Detection of MIMO Systems). Through LR transform, $\bar{H}$ is transformed into a near-orthogonal channel matrix, and then the detection is expanded in an LR domain to improve the detection performance of a MIMO near-optimal detector. Lattice-reduction-aided (LRA) K-best detectors have also developed to a certain extent. See the paper of M. Shabany and G. Gulak (The application of lattice-reduction to the K-best algorithm for near-optimal MIMO detection) and the paper of S. Roger, A. Gonzalez, V. Almenar and M. Vidal (On decreasing the complexity of lattice-reduction-aided K-best MIMO detectors).

The general K-best detection is based on real value decomposition (RVD). The LRA MIMO detection can be based on a complex number system or a real number system. The method in the present disclosure is not limited by the real number system or the complex number system. But for the convenience of illustration, the real number system is usually described as an example.

General idea of the LRA MIMO detection is described below:

For a MIMO receiving system, $\bar{r}=\bar{H}\cdot\bar{x}+\bar{n}$, $\bar{r}$ is a $N_{rx}\times 1$ receiving signal vector, $\bar{x}$ is a $N_{tx}\times 1$ sending signal vector, $\bar{n}$ is a Gaussian white noise vector, the mean value of $\bar{n}$ is zero, and the variance of $\bar{n}$ is $\delta^2$.

To apply the LRA detection, $\bar{H}$ needs to be transformed, through the lattice reduction, into a new near-orthogonal lattice basis vector matrix $\tilde{H}$ and a transform matrix $T:\tilde{H}=\bar{H}\cdot T$, where T is a unimodular matrix, elements of T belong to a Gaussian integer domain, and a determinant of T is ±1. Common lattice reduction algorithms include Lenstra-Lenstra-Lovasz (LLL) algorithm for real number systems, CLLL (Complex LLL) algorithm for complex number systems, Seysen's algorithm, Brun's algorithm and Element LR algorithm. In the present disclosure, the common LLL algorithm can be used for the real number system, and the CLLL algorithm can be used for the complex number system.

Through the lattice reduction, the above system model is transformed into $\bar{r}=\bar{H}\cdot T\cdot T^{-1}\cdot\bar{x}+\bar{n}$, where $\tilde{H}=\bar{H}\cdot T$ is a basis vector matrix of the LR, and $T^{-1}\cdot\bar{x}$ are constellation points in an LR transform domain (weight vectors). According to the definition of lattice, the constellation points in the LR domain are consecutive integers. For general M-QAM constellation values, a step size between the constellation points is 2 (unnormalized), and usually requires shifting and scaling to search a consecutive integer domain in the LR domain. The reception vector $\bar{r}$ is shifted and scaled to $$\bar{r}' = \frac{(\bar{r}+\bar{H}\cdot\bar{d})}{2},$$

where $\bar{d}$ is a vector with the same dimension as $\bar{r}$ and elements being generally 1 or 1+j (1 for real number system,  1+j for complex number system, or others). After the shifting and scaling, the system model becomes $$\bar{r}' = \bar{H}\cdot T\cdot T^{-1}\frac{(\bar{x}+\bar{d})}{2}+\frac{\bar{n}}{2},$$

with $$\bar{z} = T^{-1}\frac{(\bar{x}+\bar{d})}{2},$$

where $\bar{z}$ is a MIMO detection object of an LR consecutive integer domain.

In the present disclosure, a simple system structure block diagram for generating and receiving data part of 802.11n/ac is taken as an example to describe a use process of the above MIMO technology combined with various technologies.

Figure 2:
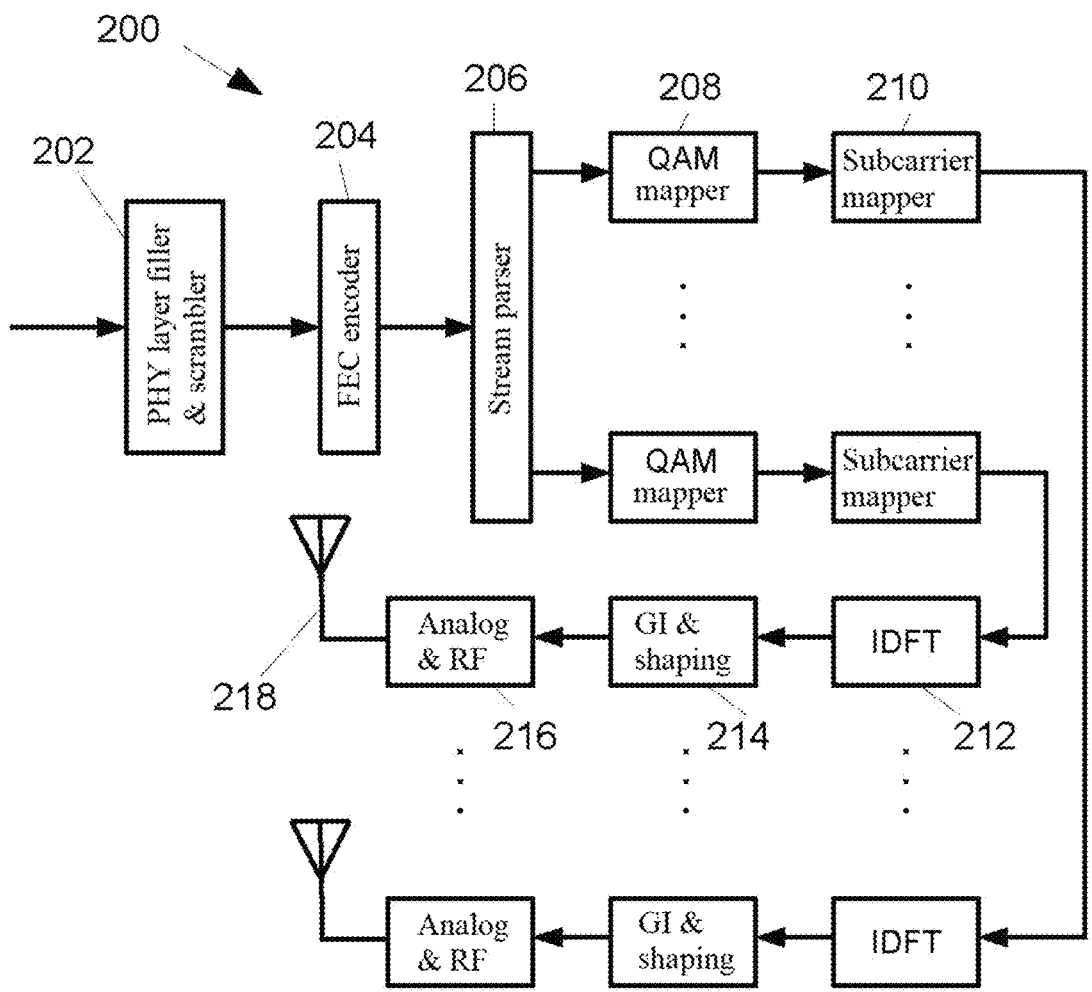
FIG. 2 is a system structure block diagram of a simple MIMO-OFDM transmission end of 802.11n/ac.

FIG. 2 gives a block diagram of a transmission end of the example system. As an example rather than a limitation, a transmission system 200 may generally include a physical layer (PHY) filler and scrambler 202, an FEC encoder 204, a stream parser 206, a plurality of QAM mappers 208, a plurality of subcarrier mappers 210, multiple inverse discrete Fourier transformers (IDFT) 212, a plurality of guard interval (GI) and shapers 216, an analog and RF signal receiver 216, and a plurality of transmitting antennas 218.

Figure 3:
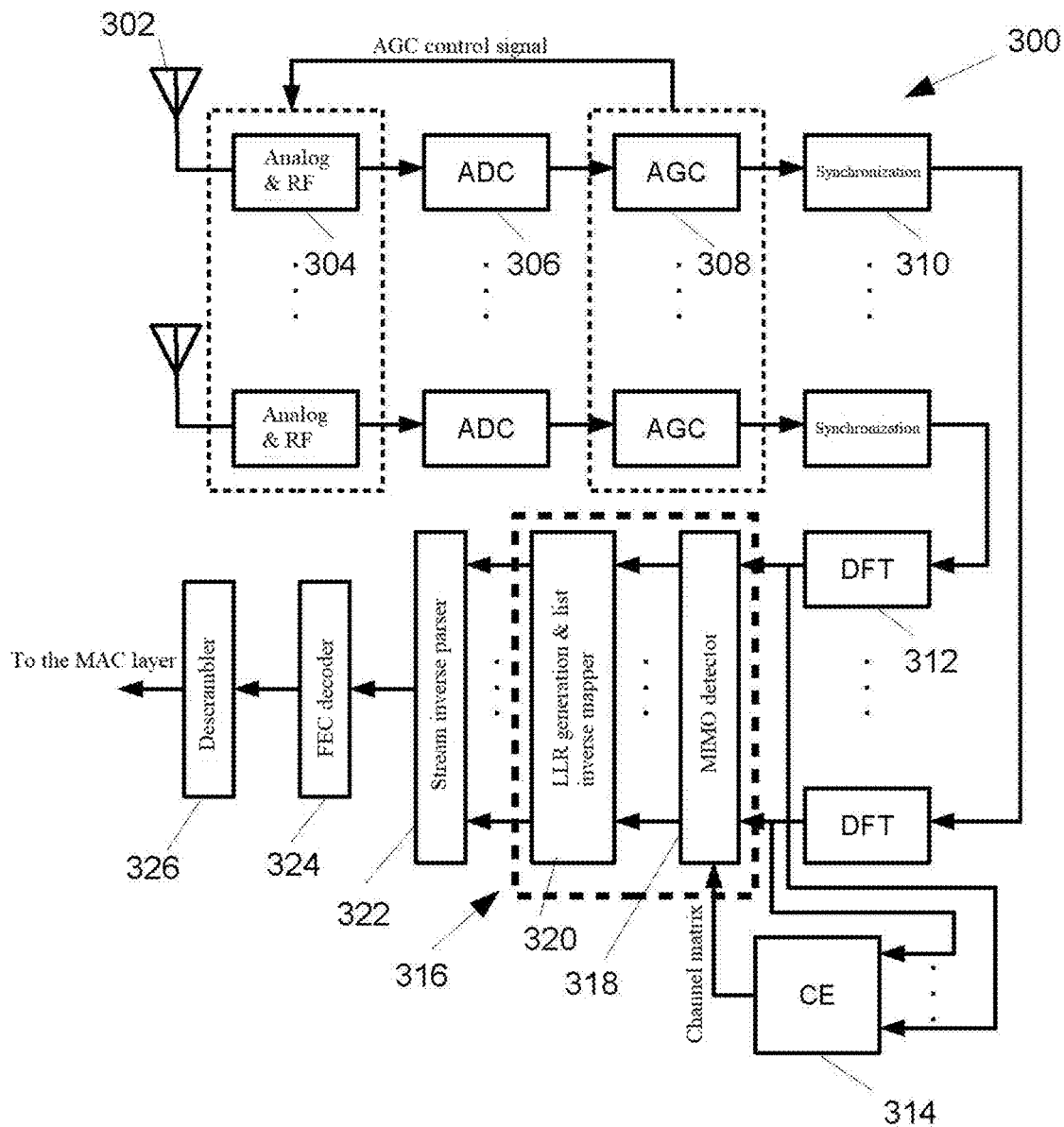
FIG. 3 is a system structure block diagram of a MIMO-OFDM receiving end.

FIG. 3 illustrates a simple block diagram of a receiving end of the example system. As a non-limiting example, a receiving system 300 may generally include a plurality of receiving antennas 302, a plurality of analog and RF signal receivers 304, a plurality of analog-to-digital converters (ADC) 306, a plurality of automatic gain control (AGC) modules 308, a plurality of synchronizers 310, a plurality of Fourier transformers 312, a channel estimation module 314, a MIMO detector 318, an LLR generation and list inverse mapper 320, a stream inverse parser 322, an FEC decoder 324, and a descrambler 326. In an exemplary embodiment, the method and system of the present disclosure can be specifically implemented in a hardware part surrounded by a dashed line box 316. It should be understood that the method and system of the present disclosure may be implemented in whole or in part as hardware, software, firmware, and/or any combination thereof.

Assuming in a coded MIMO-OFDM system, the number of OFDM data subcarriers is $N_{sd}$. An interleaver/deinterleaver required for some channel coding and decoding is integrated into a Forward Error Correction (FEC) encoder and an FEC decoder by default.

Generally, at a transmitting end of the common MIMO-OFDM system, a channel coded data bit stream is split into a plurality of data bit streams corresponding to a plurality of transmitting antennas through a de-multiplexer or stream parser. The number of the data streams is a rank of the channel matrix. For a full rank channel matrix $\bar{H}$ of $N_{rx}\times N_{tx}$ dimensions, the number of data streams is min($N_{rx}$, $N_{tx}$). After independent M-QAM constellation point mapping, each data bit stream is loaded on $N_{sd}$ corresponding data subcarriers of an OFDM symbol, and then subject to inverse discrete Fourier transform by the IDFT module corresponding to a current antenna to transform the OFDM symbol in a frequency domain into an OFDM symbol in a time domain. In order to resist multi-path channel and adjacent band interference, a guard interval (GI) is added to a front end of each time domain OFDM symbol in a time domain waveform of a sending packet, and sent to an analog/RF end and a corresponding antenna for signal transmission after windowed shaping.

Through collaborative work of the plurality of receiving antennas, the RF/analog modules, the ADC and the AGC, the receiving end will collect a mixed signal filtered by a wireless channel into a digital signal convenient for processing. The receiving end completes frequency and time synchronization (SYNC) by processing the packet header. The synchronized signal is transformed back into a frequency domain by discrete Fourier transform (DFT). Before MIMO joint detection of a formal data packet, the receiver uses a subsidiary field loaded in the packet header (e.g., HT-LTF field in Wi-Fi) to complete MIMO channel estimation (CE) and obtain the estimated channel matrix $\bar{H}$.

The MIMO detector jointly detects a plurality of data streams transmitted in parallel by using the estimation of a current MIMO channel and receiving signals of the plurality of antennas. According to different output forms given by the MIMO detector, the subsequent Logarithm Likelihood Ratio (LLR) generation module can use different LLR generation methods to generate soft bit values suitable for subsequent FEC decoders, so as to fully exploit coding gain (CG) of current FEC.

Figure 9:
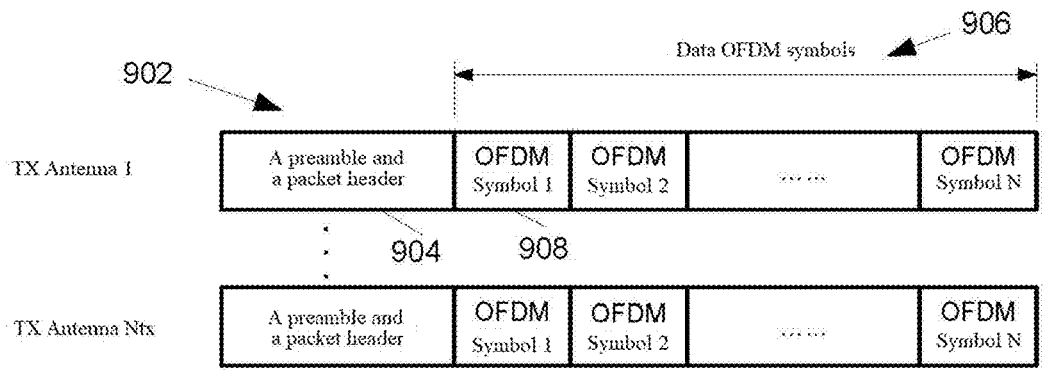
FIG. 9 is a general packet structure diagram of a MIMO-OFDM transmitting end.

FIG. 9 shows a structure diagram of a MIMO-OFDM sending packet in the time domain. Different data (i.e., data OFDM symbol part in the picture) is transmitted on N antennas. Each antenna loads different data symbols (QAM symbols) at a same subcarrier position of a same OFDM symbol period of different antennas in the same OFDM symbol period. As an example, the data 902 transmitted by each antenna includes a preamble, a packet header 904 and a data OFDM symbol part 906, in which the data OFDM symbol part further includes N OFDM symbols.

Figure 10:
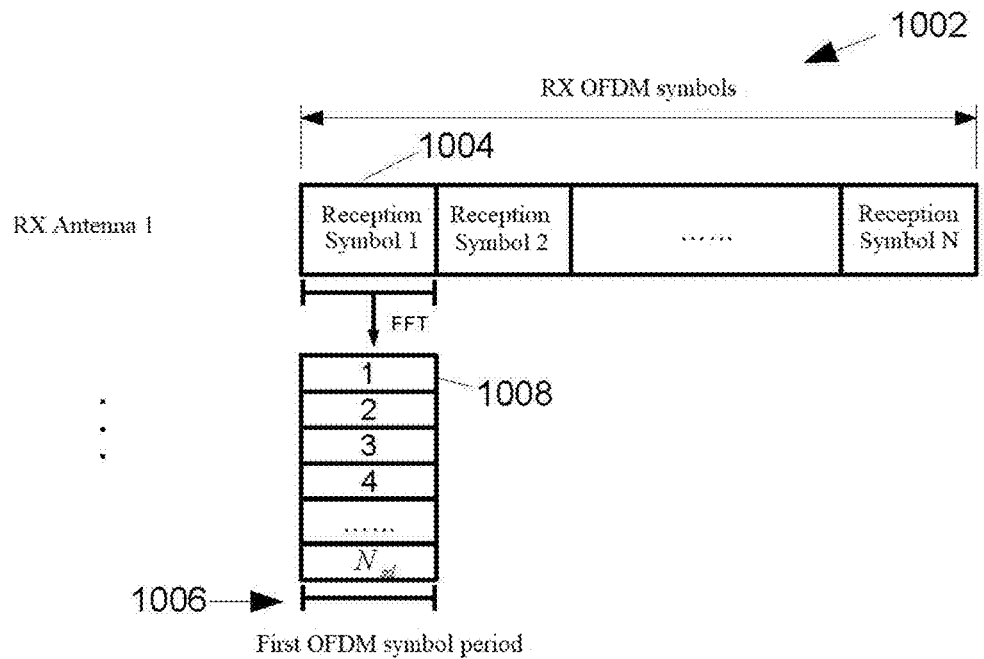
FIG. 10 is a schematic diagram illustrating a packet structure of a time domain data part of the MIMO-OFDM receiving end and an OFDM subcarrier of a signal.
Figure 10:
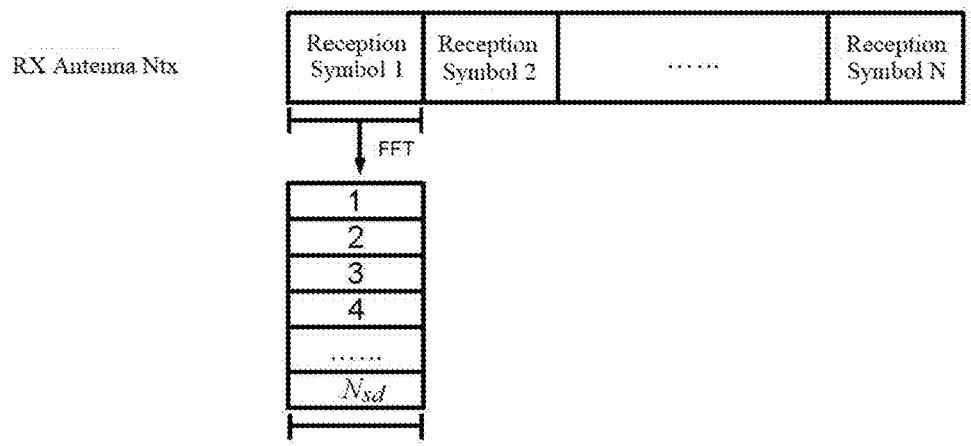

FIG. 10 shows a schematic diagram of a packet structure of a time domain data part of the MIMO-OFDM receiving end and an OFDM subcarrier of a signal. After the receiver processes the preamble and the packet header 904, the data part is received and detected. In one OFDM symbol period, the receiver transforms a time domain signal of the signal received on each antenna in the corresponding OFDM symbol period into a receiving signal on each subcarrier in an OFDM frequency band in the frequency domain through DFT. FIG. 10 illustrates a schematic diagram of transforming, through DFT, a signal in a first OFDM symbol period 1006 to $N_{sd}$ OFDM subcarriers 1008 loaded with useful data in the frequency domain. A MIMO reception and detection process is performed separately based on the receiving signals on a certain subcarrier of each antenna in an OFDM symbol period. For example, in the first OFDM symbol period 1006, a receiving signal vector of $N_{rx}$ antennas on a $1^{st}$ subcarrier is an input of a first MIMO reception and detection of a current packet.

A MIMO-OFDM wireless channel is briefly described again. In a baseband of a MIMO-OFDM system, compared with a baseband signal sampling frequency, a time domain MIMO channel $\bar{h}_\tau$ usually has a nonnegligible delay $\tau$. Therefore, the MIMO channel at this time is not a flat fading channel. The sampled time domain MIMO channel $\bar{h}_\tau$ can be abstracted into a three-dimensional complex matrix $N_{rx} \times N_{rx} \times N_\tau$. A frequency domain channel $\bar{H}_{sd}$ in a frequency domain obtained by DFT becomes a three-dimensional complex matrix $N_{rx} \times N_{rx} \times N_{sd}$ after the used data subcarriers are extracted, and a $N_{sd}$-dimensional channel response vector $\bar{H}_{sd}(i,j)$ between an $i^{th}$ transmitting antenna and a $j^{th}$ receiving antenna is frequency selective. However, for the detection of a MIMO receiving signal of each data subcarrier i, the MIMO channel on a current subcarrier is flat fading, and $N_{rx} \times N_{rx}$-dimensional channel matrices $\bar{H}_{sd}(1) \ldots \bar{H}_{sd}(N_{sd})$ of $N_{sd}$ data subcarriers have different conditions, and can be regarded as independent flat Rayleigh fading channels.

In an 802.11 system design scenario, the channel is quasi-static. That is, in the time of receiving a packet, channel condition remains unchanged, and the channel conditions experienced by each OFDM symbol are basically identical. Therefore, sequence numbers of different OFDM symbols in a same received data packet are not specially distinguished in the formulae of the following description. However, in a same OFDM symbol, the channel conditions on different subcarriers differ greatly in respective fading and correlation in practical application. The schemes in the prior art usually consider optimizing the MIMO detection on a single carrier, but fail to fully consider the channel conditions on different subcarriers and corresponding differences. However, failing to consider these differences comprehensively will seriously affect performance of coded MIMO-OFDM detection.

The present disclosure particularly relates to the MIMO detection part of MIMO information packet experiencing preamble and packet header processing and channel estimation in a MIMO-OFDM system.

Assuming that the processing of the preamble and the packet header of the current packet by a receiving system makes time and frequency synchronization ideal, neither inter-subcarrier interference nor inter-symbol interference is introduced into the system, and a rotation of an M-QAM constellation does occur.

Assuming that the MIMO receiving system has completed frequency domain channel estimation, a $N_{rx} \times N_{rx}$ channel matrix is obtained for each subcarrier loaded with data.

When the MIMO detector in the present disclosure performs the MIMO detection for an $n^{th}$ subcarrier receiving signal of an OFDM symbol, the inputs include a MIMO receiving complex vector $\bar{r}^n$ on the $n^{th}$ subcarrier, a channel complex matrix $\bar{H}^n = \bar{H}_{sd}(n)$ on the $n^{th}$ subcarrier, and a noise variance estimation vector $\bar{\delta}^2$.

Generally, the receiving conditions of various antennas are different, and the noise variances are also different. For the convenience of expression, the noise variances of various antennas are identical: $\delta_1^2 = \delta_2^2 = \ldots = \delta_{N_{rx}}^2 = \delta^2$.

A transmission equation of the MIMO channel is: $\bar{r}^n = \bar{H}^n \cdot \bar{x}^n + \bar{n}^n$.

The MIMO detector on the $n^{th}$ subcarrier is configured to give $\bar{r}^n$, $\bar{H}^n$ and $\bar{\delta}^2$, and solve an optimal $\bar{x}^n$ estimation value. For a MIMO-OFDM system with channel coding and decoding, the MIMO detector on the $n^{th}$ subcarrier is configured to generate an optimal LLR soft value to maximize channel coding gain.

The K-best-based MIMO detection method of the LRA K-dynamic programming of the present disclosure is especially suitable for two different scenarios.

A first scenario: the system has sufficient time to perform channel matrix preprocessing between obtaining a channel estimation result and performing the detection of the data part of the current packet.

A second scenario: the system does not have sufficient time to perform channel matrix preprocessing between obtaining a channel estimation result and performing the detection of the data part of the current packet.

"Sufficient time" means that the MIMO receiver has sufficient resources to provide sufficient operation speed and storage space between end of the channel estimation and a required time point of the end of the current packet detection, so that the matrix channel preprocessing and subsequent data detection can be carried out separately in detection. It should be understood that for the specific implementation of the present disclosure, the selection of the scenarios usually depends on system software and hardware environment and parameters, the protocols used, etc. Generally, in system design stage, those skilled in the art can determine which scenario is suitable for the system according to design needs.

In addition, the K-best MIMO detection system in an LR domain can be based on a real number system or a complex number system. Firstly, a real number system is taken as an example to describe the steps of the method of the present disclosure as follows.

The First Scenario

Figure 4:
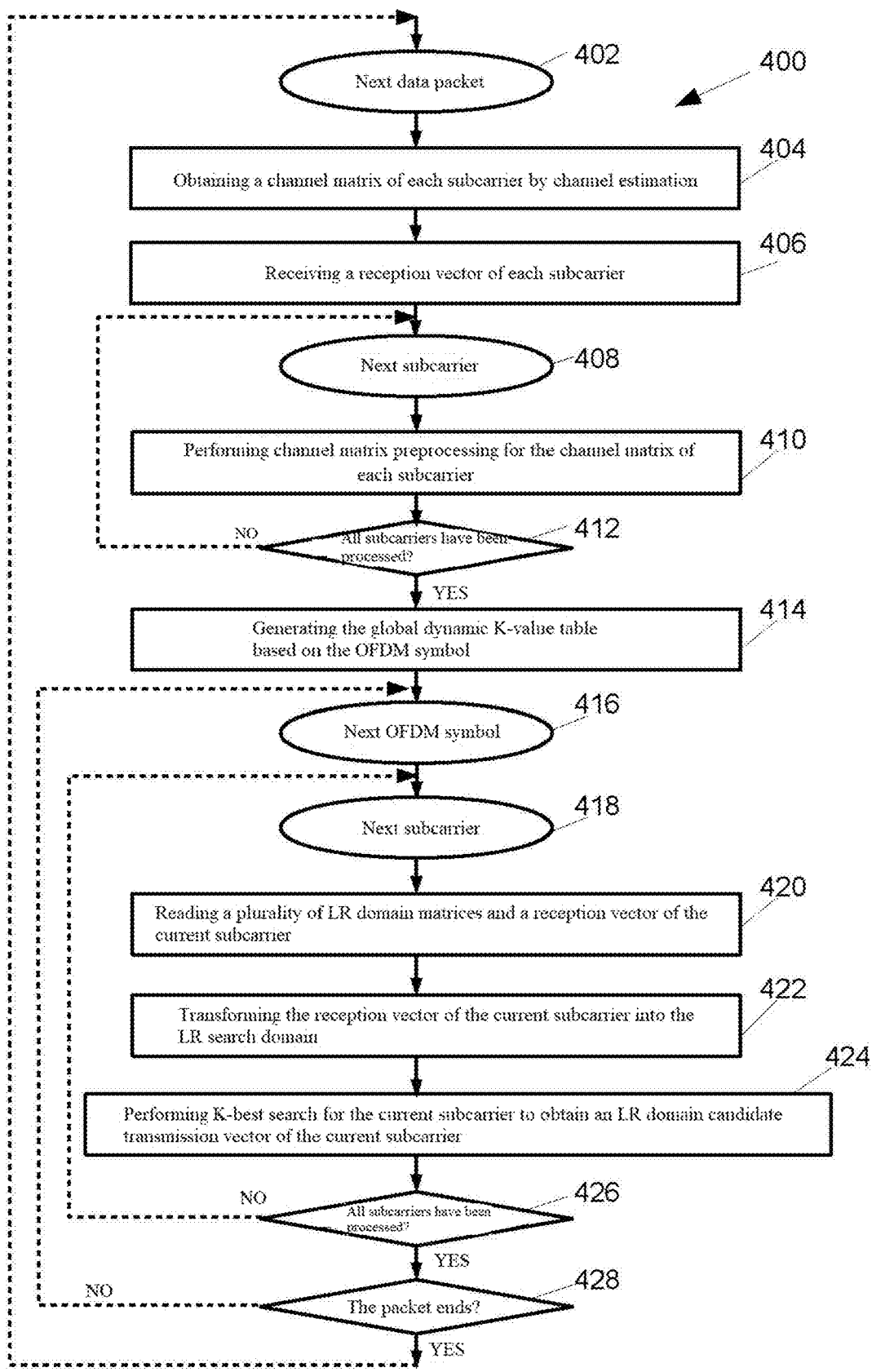
FIG. 4 is an overall flow chart of one embodiment of the method according to the present disclosure in a first scenario.

FIG. 4 shows an overall flow chart of one embodiment of the method according to the present disclosure in the first scenario. As shown in FIG. 4, a signal detection method 400 for a MIMO-OFDM wireless communication system according to the present disclosure includes processing a plurality of MIMO-OFDM data packets. Specifically, the method includes processing each MIMO-OFDM data packet of the plurality of MIMO-OFDM data packets one by one with starting from step 402.

In step 404, a channel matrix of each subcarrier is obtained by channel estimation. In step 406, a reception vector of each subcarrier is received.

Next, the channel matrix preprocessing is performed on the channel matrix of each subcarrier through a cycle from step 408 to step 412. When all subcarriers have been processed according to determination in step 412, a global dynamic K-value table based on OFDM symbols is generated in step 414. Specifically, the channel matrix preprocessing in step 410 includes performing decomposition and lattice reduction for the channel matrix of the current subcarrier to generate a plurality of LR domain matrices of the current subcarrier. In addition, the global dynamic K-value table generated in step 414 includes a global dynamic K-value corresponding to each search layer of each subcarrier.

Then, the MIMO detection is performed on each OFDM symbol in the MIMO-OFDM data packet, in which the MIMO detection includes performing processing for each subcarrier of a current OFDM symbol through a cycle from step 418 to step 426. Specifically, in step 420, a plurality of LR domain matrices and a reception vector of the current subcarrier are read. In step 422, the reception vector of the current subcarrier is transformed into an LR search domain. And in step 424, K-best search is performed for the current subcarrier to obtain an LR domain candidate transmission vector of the current subcarrier. A K-value applied to each search layer of the current subcarrier in the K-best search is a global dynamic K-value in the global dynamic K-value table corresponding to the search layer.

Different from the MIMO detection method in the prior art, the signal detection method of the present disclosure, such as the signal detection method 400, provides specially optimized channel matrix preprocessing for the MIMO-OFDM wireless communication system, fully considers frequency selective fading on the subcarriers, and dynamically allocates the K-value without increasing system search resources.

Figure 5:
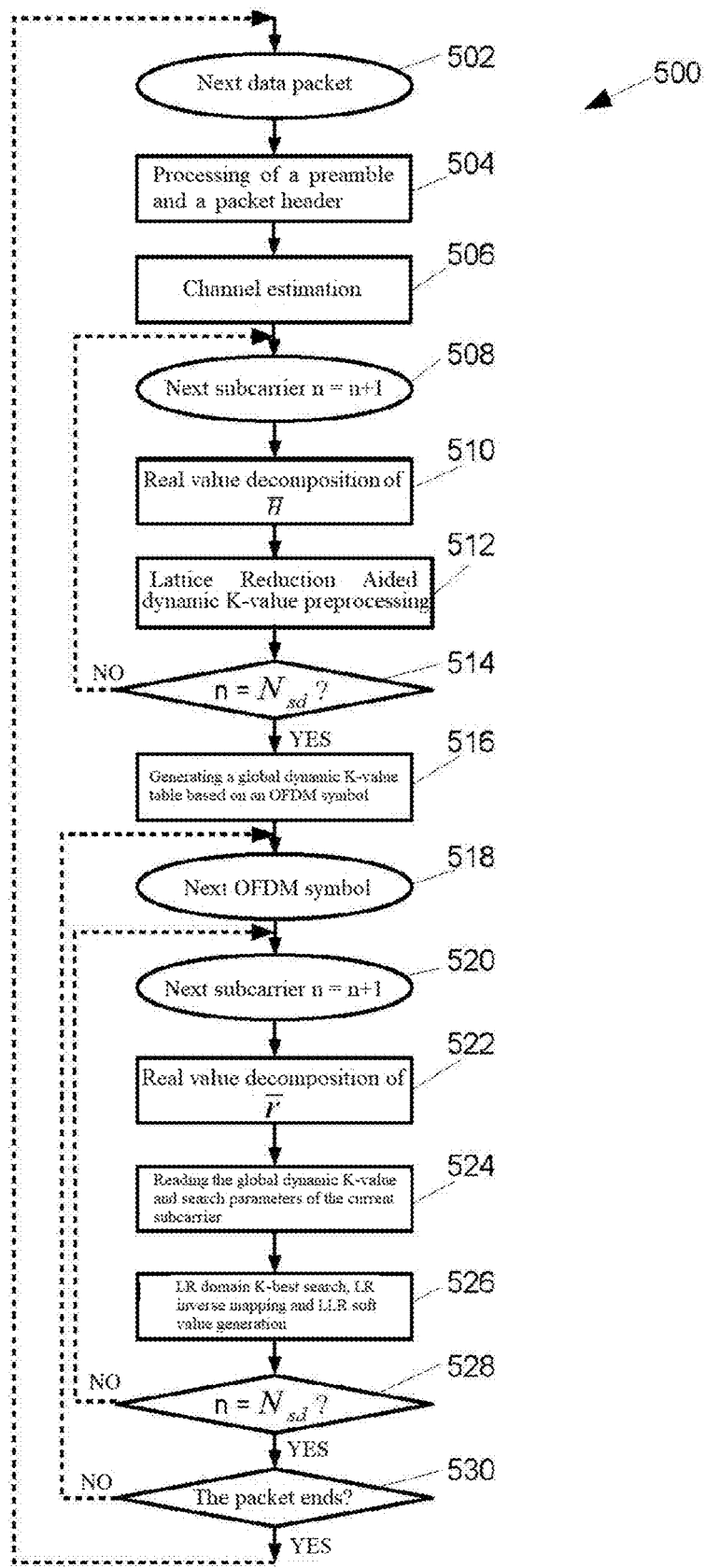
FIG. 5 is an overall flow chart of a more detailed embodiment of the method according to the present disclosure in the first scenario.

Details of the signal detection method of the present disclosure in the first scenario are described below in more detail with reference to FIG. 5. FIG. 5 shows an overall flow chart of a more detailed embodiment of the method according to the present disclosure in the first scenario. A signal detection method 500 for a MIMO-OFDM wireless communication system shown in FIG. 5 starts with step 502 in which each MIMO-OFDM data packet in a plurality of MIMO-OFDM data packets is processed.

In step 504, a preamble and a packet header are processed. In step 506, channel estimation is performed.

From step 508 to step 506, each subcarrier is cyclically processed to perform channel matrix preprocessing for a channel matrix of each subcarrier.

Specifically, in step 510, real value decomposition (RVD) is performed on a complex number input to a MIMO detection system. The RVD is performed on a receiving complex vector $\bar{r}^n$ and a channel complex matrix $\bar{H}^n$ of an $n^{th}$ subcarrier to generate $\overline{rr}^n$ and $\overline{Hh}^n$. A noise variance estimation vector $\bar{\delta}^2$ is split to double its dimension. After the RVD, a transmission equation of the MIMO system is changed to be: $\overline{rr}^n = \overline{Hh}^n \cdot \overline{xx}^n + \overline{nn}^n$. The RVD has different decomposition methods, and the present disclosure is not limited to the decomposition method described herein.

In step 512, LRA dynamic K preprocessing (i.e., channel matrix preprocessing) is performed. In an exemplary embodiment of the present disclosure, the channel matrix preprocessing in step 512 may be performed according to the channel matrix preprocessing flow chart shown in FIG. 11. Specifically, a process of performing the lattice reduction preprocessing for the channel matrix $\overline{Hh}^n$ of the $n^{th}$ subcarrier can be carried out according to an example method 1100 shown in FIG. 11 as follows:

In step 1102, MMSE expansion is performed on $\overline{Hh}^n$:

$$\underline{H}^n = \begin{bmatrix} \overline{Hh}^n \\ \frac{\bar{\delta}}{\sqrt{2}} \cdot \tilde{I}_{2N_{tx}} \end{bmatrix}.$$

$\tilde{I}_M$ is a M×M-dimensional diagonal matrix with diagonal of 1.

In step 1104, sorted QR decomposition is performed on $\underline{H}^n$:

$\underline{H}^n \cdot \underline{P}^n = \underline{Q}^n \cdot \underline{R}^n$, where $\underline{P}^n$ is a permutation matrix, $\underline{Q}^n$ is a unitary matrix, and $\underline{R}^n$ is an upper triangular matrix.

In step 1106, LLL lattice reduction is performed on a sorted QR decomposition (SQRD) result $\underline{Q}^n \underline{R}^n \underline{P}^n$ to obtain a new lattice basis vector matrix:

$\widetilde{H}^{\tilde{n}} = \widetilde{Q}^{\tilde{n}} \cdot \widetilde{R}^{\tilde{n}} = \underline{H}^n \cdot \underline{P}^n \cdot \widetilde{T}^n$. $\underline{T}^n = \underline{P}^n \cdot \widetilde{T}^n$ is recorded as a new permutation matrix, and $\widetilde{H}^{\tilde{n}} = \widetilde{Q}^{\tilde{n}} \cdot \widetilde{R}^{\tilde{n}} = \underline{H}^n \cdot \underline{T}^n$.

Resulted $\widetilde{Q}^{\tilde{n}}$, $\widetilde{R}^{\tilde{n}}$ and $\underline{T}^n$ are stored for MIMO detection of subsequent OFDM symbols of a current packet.

In step 1108, an inverse matrix $(\underline{T}^n)^{-1}$ of the permutation matrix $\underline{T}^n$ is solved.

In step 1110, an LR domain search boundary of each MIMO detection layer on the current $n^{th}$ subcarrier (i.e., a search range of a search variable of an LR domain) is solved.

A search variable of the current LR domain is $$\overline{zz}^n = (\underline{T}^n)^{-1} \frac{(\overline{xx}^n + \bar{d})}{2}.$$

After real constellation points $\underline{xx}^n$ after the RVD are shifted and scaled, the value range changes, and is recorded as $$\overline{ss} = \frac{(\overline{xx} + \overline{d})}{2}.$$

$s_l$ is a constellation element of a $l^{th}$ layer of $\overline{ss}$, with $s_l \in \Omega$. Then an upper boundary and a lower boundary of an LR domain element search of the $l^{th}$ layer of a $k^{th}$ subcarrier can be calculated by the following formulas:

$$z_{l,max}{}^n = \max(\Omega) \cdot \Sigma((\underline{T}^n)^{-1}[l])_+ + \min(\Omega) \cdot \Sigma((\underline{T}^n)^{-1}[l])_-;$$

$$z_{l,min}{}^n = \min(\Omega) \cdot \Sigma((\underline{T}^n)^{-1}[l])_+ + \max(\Omega) \cdot \Sigma((\underline{T}^n)^{-1}[l])_-.$$

In the formula, $(\underline{T}^n)^{-1}[l]$ is a $l^{th}$ row of matrix $(\underline{T}^n)^{-1}$; $((\underline{T}^n)^{-1}[l])_+$ is a positive element in the $l^{th}$ row of $(\underline{T}^n)^{-1}$; and $(\underline{T}^n)^{-1}[l])_-$ is a negative element in the $l^{th}$ row of $(\underline{T}^n)^{-1}$.

As $\overline{z}^n$ is a consecutive integer domain experiencing lattice reduction, the total number of valid candidate points in the LR domain of the $l^{th}$ layer of the $n^{th}$ subcarrier is: $L_l{}^n = z_{l,max}{}^n - z_{l,min}{}^n + 1$.

The valid candidate points refer to integer domain elements between the upper boundary and the lower boundary of the LR domain. The valid candidate points within the range may be valid constellation points (QAM constellation points before the original lattice reduction), and the valid candidate points outside the range must not be valid constellation points.

Resulted $L_l{}^n$, $z_{l,max}{}^n$ and $z_{l,min}{}^n$ of all search layers of all subcarriers are stored for the MIMO detection of subsequent OFDM symbols of the current packet and generation of a global dynamic K-value table.

It should be understood that the steps shown in the above channel matrix preprocessing are shown only as non-limiting example steps capable of implementing the present disclosure. The scope of the present disclosure is not limited thereto.

Returning to FIG. 5, after the channel matrix preprocessing, a plurality of LR domain matrices of the current subcarrier generated by decomposition and lattice reduction of the channel matrix of the current subcarrier are obtained. At the same time, search parameters for each subcarrier are optionally obtained. Exemplarily, the search parameters may include an LR domain search upper boundary and an LR domain search lower boundary corresponding to each search layer of each subcarrier.

In step 516, after preprocessing of the channel matrices of all subcarriers, a dynamic K-value of each layer of the MIMO detection of the current subcarrier is obtained to generate a global dynamic K-value table.

In one embodiment of the present disclosure, the global dynamic K-value corresponding to each search layer of each subcarrier can be determined according to one of the following steps or a combination of a plurality of steps: (1) for the subcarriers with poor channel conditions, increasing the global dynamic K-value corresponding to the search layer of the subcarrier; (2) assigning a weight to the global dynamic K-value corresponding to each search layer of each subcarrier, wherein for the search layer closer to an initial search layer, a larger weight is assigned to the global dynamic K-value corresponding to the search layer; (3) grouping the subcarriers, and determining the global dynamic K-value corresponding to each search layer of each subcarrier for the subcarriers in the group; (4) taking the global dynamic K-value corresponding to each search layer of each subcarrier as a positive integer positively related to a search range size of each search layer; and (5) segmenting the search range size of all search layers of each subcarrier, and assigning a corresponding global dynamic K-value to each segment of the search range size, so that a segment with a larger search range corresponds to a larger global dynamic K-value; in which the search range of each search layer can be determined according to the following formula:

$$L_l{}^n = z_{l,max}{}^n - z_{l,min}{}^n + 1.$$

The steps 508 to 516 are performed once during the detection of the current packet. The following steps 522 to 526 need to be performed when the MIMO detection is performed on all data subcarriers of all OFDM symbol periods.

In step 522, the RVD is performed on a reception vector $\overline{r}^n$ of an $n^{th}$ subcarrier of a current OFDM symbol to generate $\overline{rr}^n$.

In step 524, the global dynamic K-value and search parameters of the current subcarrier are read. In one embodiment, a MIMO detector reads the stored channel matrix preprocessing result of the $n^{th}$ subcarrier and a K-value vector $\overline{K}^n = [K_1{}^n K_2{}^n \ldots K_L{}^n]$ in the global dynamic K-value table of all subcarriers based on OFDM symbols of the current $k^{th}$ subcarrier for subsequent MIMO detection.

In step 526, LR domain K-best search, LR inverse mapping and LLR soft value generation are performed. As a non-limiting embodiment, the step 526 may be specifically implemented by the steps shown in FIG. 8.

Figure 8:
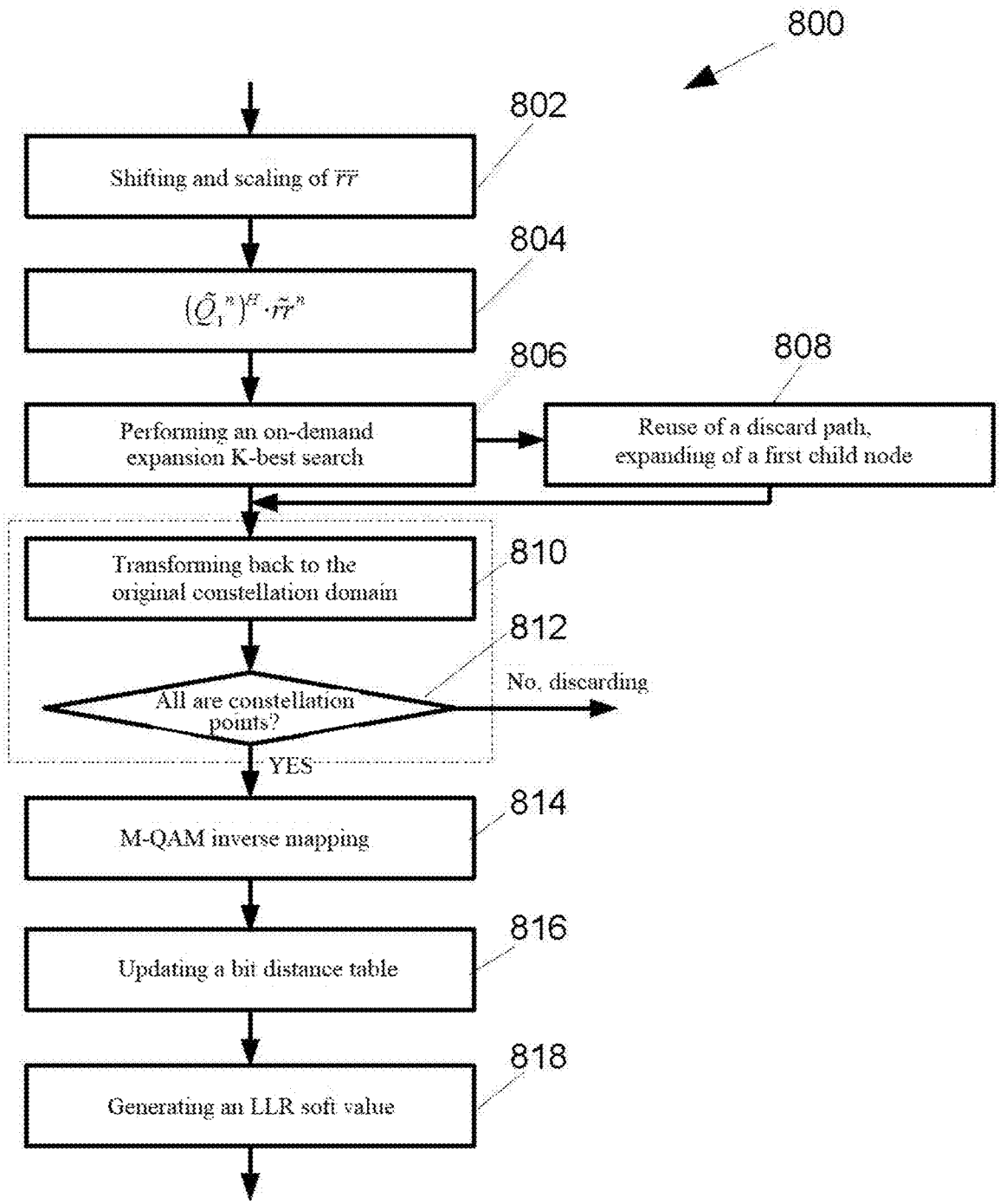
FIG. 8 is a flow chart of LR domain MIMO detection and LLR soft bit generation on a single subcarrier.

FIG. 8 specifically shows a flow chart of LR domain MIMO detection and LLR soft bit generation on a single subcarrier according to one embodiment of the present disclosure.

In step 802, the reception vector $\tilde{rr}^n$ processed in the step 510 is shifted and scaled.

$$\tilde{rr}^n = \frac{(\tilde{r}^n + \overline{Hh}^n \cdot \overline{d})}{2}.$$

Then a shifted and scaled MIMO channel transmission system can be written as:

$$\tilde{rr}^n = \overline{Hh}^n \cdot \overline{ss} + \frac{\overline{nn}}{2}.$$

In step 804, a matrix $\tilde{Q}^n$ obtained in step 1106 has a dimension of $(N_{rx} + N_{tx}) \times N_{tx}$. $\tilde{Q}^n$ can be split into:

$$\tilde{Q}^n = \begin{bmatrix} \tilde{Q}_1^n \\ \tilde{Q}_2^n \end{bmatrix} \cdot \overline{\tilde{Q}_1}^n$$

has a dimension of $N_{rx} \times N_{tx}$, and $\overline{\tilde{Q}_2}^n$ has a dimension of $N_{tx} \times N_{tx}$.

The reception vector $\tilde{rr}^n$ shifted and scaled in step 802 is premultiplied by a conjugate transpose of $\overline{\tilde{Q}_1}^n$ to obtain an input of a K-best MIMO detector:

$$\overline{yy}^n = (\overline{\tilde{Q}_1}^n)^H \cdot \tilde{rr}^n = \tilde{R}^n \cdot \overline{zz} + \overline{\lambda}.$$

$\overline{\lambda}$ is a sum vector of residual interference and noise, and can be expressed as:

$$\overline{\lambda} = -(\overline{\tilde{Q}_2}^n)^H \cdot \frac{\delta}{\sqrt{2}} \cdot \overline{I}_L \cdot \overline{ss} + (\overline{\tilde{Q}_1}^n)^H \cdot \frac{\overline{nn}}{2}.$$

L is the number of layers of the k-best search in the MIMO detection. From the expression $\bar{\lambda}$, when SNR is large, the term $\bar{\lambda}$ can be ignored.

$\overline{zz}$ is a real LR domain search vector.

$\tilde{R}^n$ is an upper triangular matrix generated by the channel matrix preprocessing of the $n^{th}$ subcarrier obtained in the step 1106.

$$\tilde{R}^n = \begin{bmatrix} R_{11} & R_{12} & \ldots & R_{1L} \\ 0 & R_{22} & \ldots & R_{2L} \\ \vdots & \vdots & \ddots & \vdots \\ 0 & 0 & \ldots & R_{LL} \end{bmatrix}$$

In step 806, an on-demand expansion K-best search is performed.

In the real number system, $L=2N_{tx}$.

A system equation after preprocessing is $\overline{yy}^n = \tilde{R}^n \cdot \overline{zz}$ after residual interference and noise terms are ignored.

Therefore, the whole vector can be estimated recursively from an $L^{th}$ layer of the vector $\overline{zz}$, and the K-best search can be carried out layer by layer.

A) For a top layer (i.e., the $L^{th}$ layer) in a K-best search tree of the current subcarrier, an estimated value of a transmission vector element is:

$$\widetilde{zz}_L = \frac{yy_L^n}{R_{LL}}.$$

After quantification, a first child node $\widehat{zz}_{L,1}$ of the layer (i.e., a first on-demand expansion child node) is obtained.

Then, according to a fast enumeration sequence from near to far, candidate partial vectors of $K_L^n$ $L^{th}$ layers is expanded within the boundary $[Z_{L,min}^n, Z_{L,max}^n]$ of the layer to $[\widehat{zz}_{L,1}, \widehat{zz}_{L,2} \ldots \widehat{zz}_{L,K_L}^n]$. $K_L^n$ is the number of candidate paths (or search expansion resource allocation) of the $L^{th}$ layer of the $n^{th}$ subcarrier stored in the dynamic K-value table.

A partial Euclidean distance (PED) between each candidate partial vector and a partial reception vector is calculated at the same time. Many methods are available for calculating Euclidean distance. The present disclosure takes squared distance as an example, but is not limited thereto.

The PED of an LR domain corresponding to a $p^{th}$ candidate partial vector of the $L^{th}$ layer is:

$$PED(L,p) = (yy_L^k - R_{LL} \cdot \widehat{zz_{L,p}})^2.$$

The fast enumeration expansion method from near to far is shown in FIG. 9.

B) For each search layer other than the top layer in the K-best search tree, that is, an $l^{th}$ search layer between a $(L-1)^{th}$ layer and a first layer, an upper layer thereof (i.e., a $(l+1)^{th}$ layer) provides the layer with $K_{(l+1)}^n$ candidate partial vectors and corresponding $K_{(l+1)}^n$ PED(l+1) values. For the candidate partial vector of each $(l+1)^{th}$ layer (assumed here as the $p^{th}$ candidate partial vector), calculation is performed as follows:

$$\widetilde{zz}_{l,p} = \frac{yy_l^n - \sum_{m=l+1}^{L} R_{l,m} \cdot \hat{zz}_{m,p}}{R_{LL}}.$$

After quantification, on-demand expansion first child nodes $[\widehat{zz}_{L,1} \ \widehat{zz}_{L,2} \ \ldots \ \widehat{zz}_{L,K_{(l+1)}}^n]$ of $K_{(l+1)}^n$ $l^{th}$ layers are obtained.

According to a relative position of $\widetilde{zz}_{l,p}$ and $\widehat{zz}_{l,p}$ and a defined search range $[Z_{l,min}^n, Z_{l,max}^n]$ of this layer, positions of $K_{(l+1)}^n$ next child nodes for fast enumeration expansion are determined.

An LR domain PED value of the candidate partial vector corresponding to each first child node is calculated:

$$PED(l,p) = (yy_l^n - \Sigma_{m=l}^{L} R_{l,m} \cdot \widehat{zz}_{m,p})^2 + PED(l+1,p).$$

A candidate part vector with minimum $K_{(l+1)}^n$ PED(l,p) is found from the candidate partial vectors corresponding to the first child nodes of current $l^{th}$ layer as a first candidate output vector of $K_l^n$ candidate partial vectors to be output by the $l^{th}$ layer.

The candidate partial vector with the first child node of the $l^{th}$ layer extracted is expanded to a second child node of the $l^{th}$ layer according to a search direction and step size of a next child node of the $l^{th}$ layer for fast enumeration expansion, and a corresponding PED is calculated. The obtained partial vector of the $1^{st}$ layer is added to $K_{(l+1)}^n - 1$ remaining candidate partial vectors of the $l^{th}$ layer. The search direction and step size of the next child node of the point are updated.

The above operation is repeated until all $K_l^n$ output candidate partial vectors of the $l^{th}$ layer of the $n^{th}$ subcarrier of the current OFDM symbol are found.

So far, in the $l^{th}$ layer, a total of $K_{(l+1)}^n + K_l^n - 1$ child nodes are expanded, and the corresponding PED values are calculated. In addition to $K_l^n$ outputs of the $l^{th}$ layer, $K_{(l+1)}^n - 1$ suboptimal expansions will be discarded in step 6. To make full use of the expanded suboptimal path resources, the discard path will be reused in step 7.

C) When the search reaches the first layer and $K_1^n$ LR domain candidate vectors are selected, K-best search expansion of the $n^{th}$ subcarrier ends.

Figure 13:
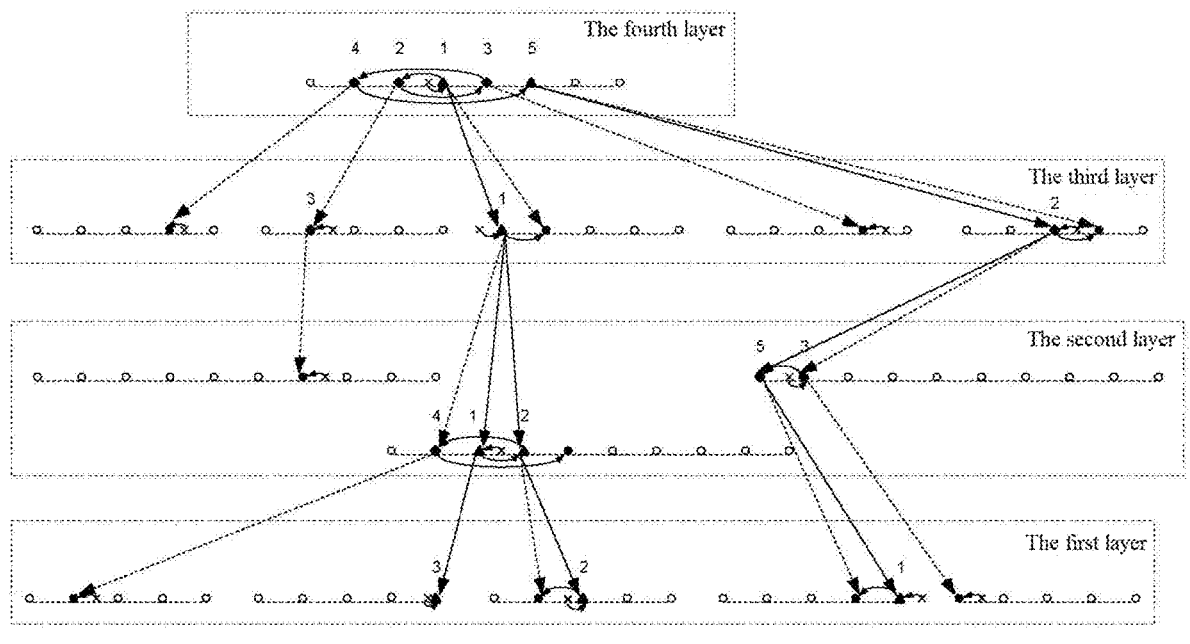
FIG. 13 is a schematic diagram of an on-demand expansion tree search of an LR domain dynamic K-value according to the present disclosure.
Figure 14:
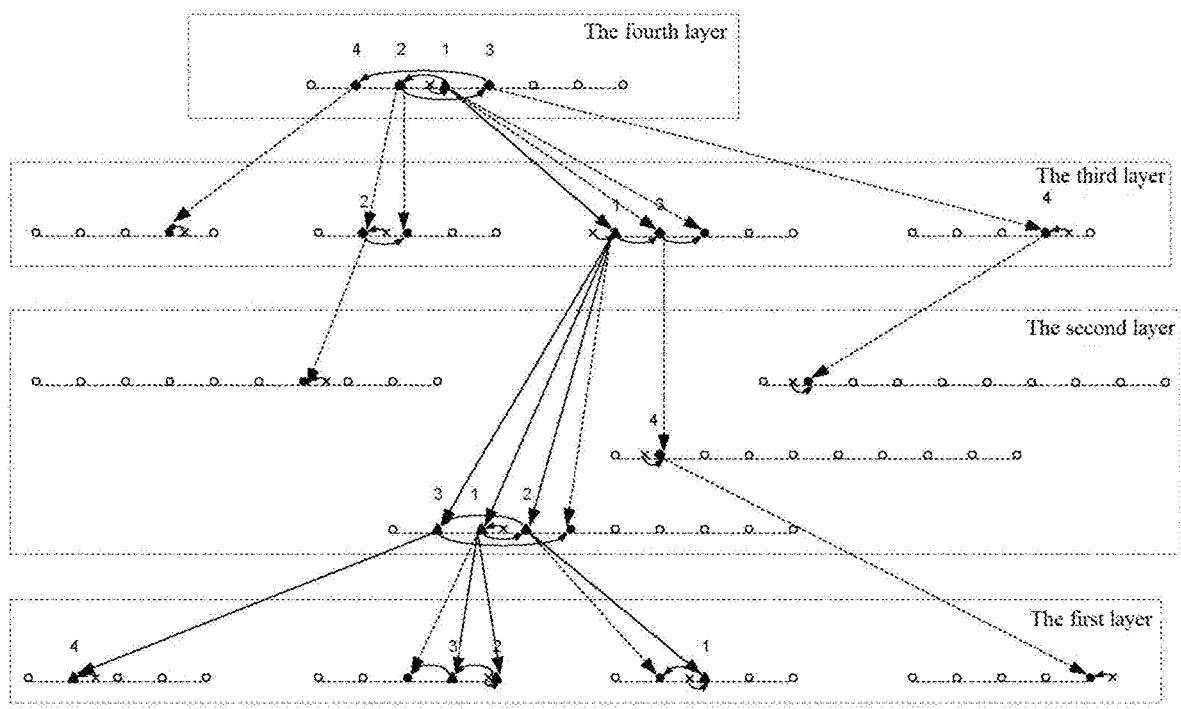
FIG. 14 is a schematic diagram of an on-demand expansion tree search of an LR domain fixed K-value according to the prior art.

Next, with reference to FIGS. 13 and 14, an on-demand expansion tree search of an LR domain dynamic K-value according to the present disclosure is compared with an on-demand expansion tree search of an LR domain fixed K-value according to the prior art. Specifically, FIG. 13 shows a process of the on-demand expansion tree search of the LR domain dynamic K-value according to the present disclosure, and FIG. 14 shows a process of the on-demand expansion tree search of the LR domain fixed K-value according to the prior art.

Assuming that both searches are based on a 2×2 MIMO real number detection system, and the number of tree search layers is 4. Assuming that a channel matrix of a corresponding subcarrier undergoes lattice reduction, and a system transmission vector undergoes shifting and scaling and LR transform, the search range of both searches from a first layer to a fourth layer is [5 10 5 8].

As shown in a table in an upper part of FIG. 13, a dynamic K-value vector $\overline{K}^k$ from the first layer to the fourth layer is [3 5 3 5]. As shown in a table in an upper part of FIG. 14, a fixed K-value vector from the first layer to the fourth layer is [4 4 4 4].

As shown in tree diagrams at lower parts of FIG. 13 and FIG. 14, the tree search starts from a top layer (i.e., the fourth layer) of the search tree and proceeds to the first layer. Compared with FIG. 13, in FIG. 14, as the search range of the fourth layer is large (8) and K-value is 4, a key candidate point is omitted in the search from the beginning, which results in a large deviation of an optimal candidate vector obtained at the last layer. The deviation will cause LLR soft value generation to deviate from actual noise distribution, resulting in a great loss of coding gain of a channel decoder.

Returning to FIG. 8, in step 808, partially expanded path to be discarded during an intermediate process of the K-best search is reused.

For $K_{(l+1)}{}^n-1$ suboptimal expansion to be discarded in the $l^{th}$ layer, expansion is continued from the $(l-1)^{th}$ layer to the first layer. For each layer, only the first child node is expanded, and a corresponding PED value is calculated. An LR domain candidate transmission vector (suboptimal candidate vector) obtained by reusing $K_{(l+1)}{}^n-1$ $l^{th}$ layer discard path is subject to subsequent steps 810 to 816 to update a bit distance table.

The steps 810 to 816 are processing steps of all complete LR domain candidate transmission vectors with the tree search reaching the first layer. The processing process is identical for $K_1{}^n$ LR domain candidate vectors obtained in step 806 and $K_{(l+1)}{}^n-1$ LR domain candidate vectors obtained by reusing the discard path in each layer in step 808.

In step 810, a $p^{th}$ LR domain candidate transmission vector $\widehat{\widetilde{zz}}_p{}^n$ in the MIMO detection of the $n^{th}$ subcarrier is transformed into a candidate vector $\widehat{\widetilde{xx}}_p{}^n = 2\overline{T}^n \cdot \widehat{\widetilde{xx}}_p{}^k - \overline{d}$ of an original constellation domain.

In step 812, all elements of the candidate vector $\widehat{\widetilde{xx}}_p{}^n$ are determined to be legal constellation points or not. If all elements are legal constellation points, $\widehat{\widetilde{xx}}_p{}^n$ and PED values PED$^n$(p) thereof are retained. If any element in the vector $\widehat{\widetilde{xx}}_p{}^n$ cannot be mapped back to the original constellation domain, $\widehat{\widetilde{xx}}_p{}^n$ is not a legal LR domain transmission vector estimation, and $\widehat{\widetilde{xx}}_p{}^n$ will be discarded by the MIMO detector.

In step 814, all constellation points of the legal candidate vector of the original constellation domain retained in step 812 are subject to M-QAM constellation point inverse mapping to obtain a corresponding bit sequence.

In step 816, the bit distance table is updated.

Table 1 below shows the structure of a bit distance table with a 64QAM 2×2 MIMO system as an example. $b_{i,t}$ denotes a $t^{th}$ bit of a QAM symbol of an $i^{th}$ transmitting antenna. A value filled in a position corresponding to items PED$_{min,0}$ and $b_{i,t}$ in the table is a minimum PED value of all candidate vectors whose bit $b_{i,t}$ is 0. Similarly, a value filled in a position corresponding to items PED$_{min,1}$ and $b_{i,t}$ in the table is a minimum PED value of all candidate vectors whose bit $b_{i,t}$ is 1. At the start of the MIMO detection of the $n^{th}$ subcarrier, the bit distance table is initialized, for example, a large PED value is filled in.

TABLE 1

Bit distance table-64QAM 2 × 2 MIMO system

| | PED$_{min,0}$ | PED$_{min,1}$ |
|---|---|---|
| $b_{1,0}$ | | |
| $b_{1,1}$ | | |
| $b_{1,2}$ | | |
| $b_{1,3}$ | | |
| $b_{1,4}$ | | |
| $b_{1,5}$ | | |
| $b_{2,0}$ | | |
| $b_{2,1}$ | | |
| $b_{2,2}$ | | |
| $b_{2,3}$ | | |
| $b_{2,4}$ | | |
| $b_{2,5}$ | | |

After candidate vector outputs of the legal constellation point are generated through step 810 and step 812, the candidate vectors of the legal constellation point are inversely mapped into a bit sequence through the M-QAM inverse mapping in step 814, and a PED value thereof is compared with the filled PED$_{min,0}$ or PED$_{min,1}$ at corresponding position of 0 or 1 in the bit distance table. If the new PED value is smaller, the PED value at the corresponding position in the bit distance table is updated; otherwise, the PED value is not updated.

When step 806 reaches the first layer, steps 810 to 816 are performed on all the resulting LR domain candidate vectors, and all the candidate vectors of the $n^{th}$ subcarrier have completed the update of the bit distance table. So far, the bit distance table of the $n^{th}$ subcarrier of the current OFDM symbol is completed.

In step 818, an LLR soft value is generated according to the bit distance table obtained in step 816. In one embodiment, the LLR soft value of the corresponding bit can be generated by subtracting PED$_{min,1}$ from PED$_{min,0}$ of the corresponding row in the bit distance table, as shown in the following formula:

$$LLR(b_{i,t}) = PED_{min,0} - PED_{min,1}.$$

The generated LLR soft value can be processed by a reasonable clipping algorithm, sent to a subsequent stream inverse parser module, and then sent to a channel decoder for decoding. Those skilled in the art should understand that the LLR soft value generated by the method and system according to the disclosure can be processed and decoded in a conventional manner in the art.

Figure 11:
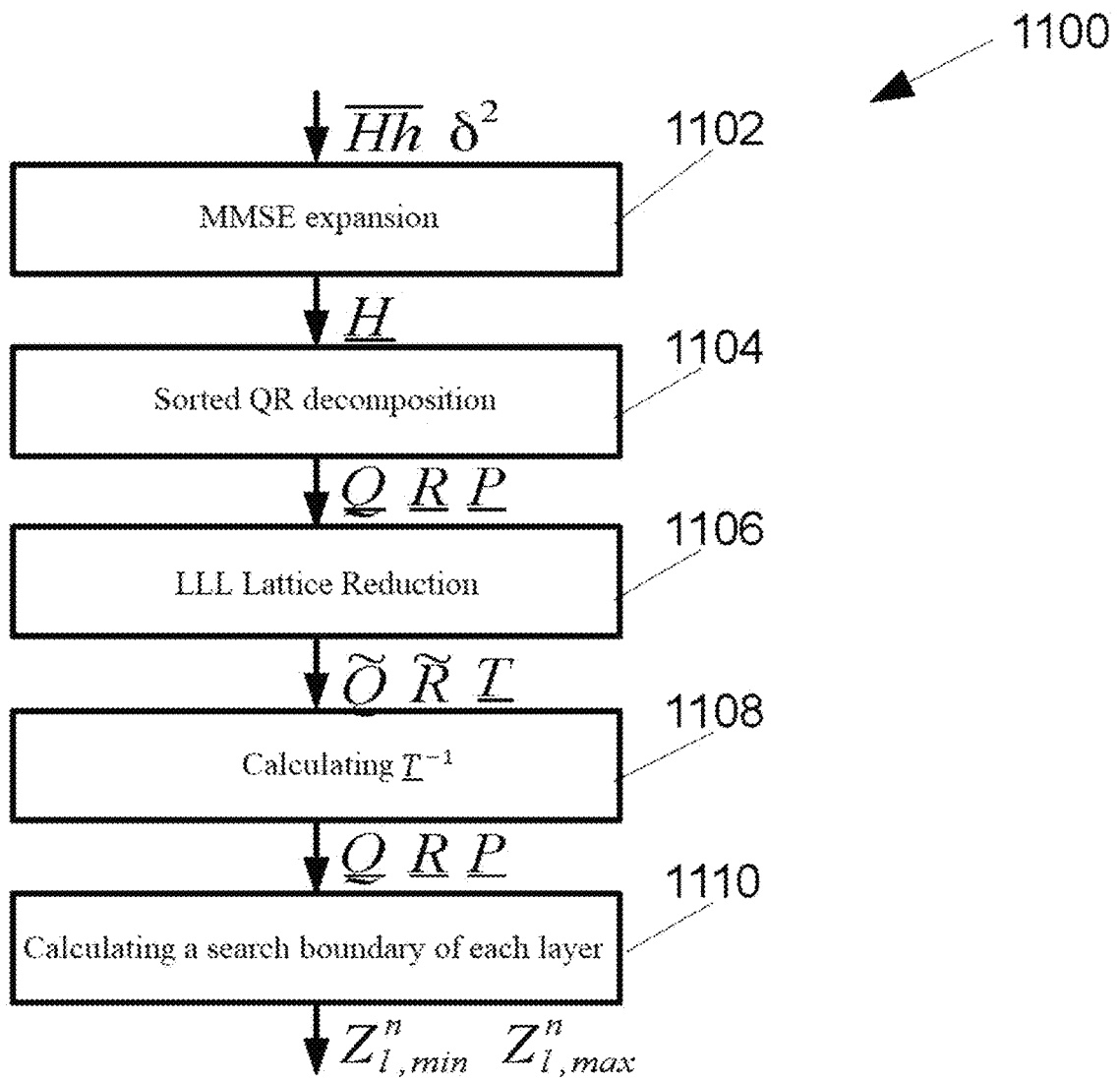
FIG. 11 is a preprocessing flow chart of a channel matrix for a subcarrier.
Figure 12:
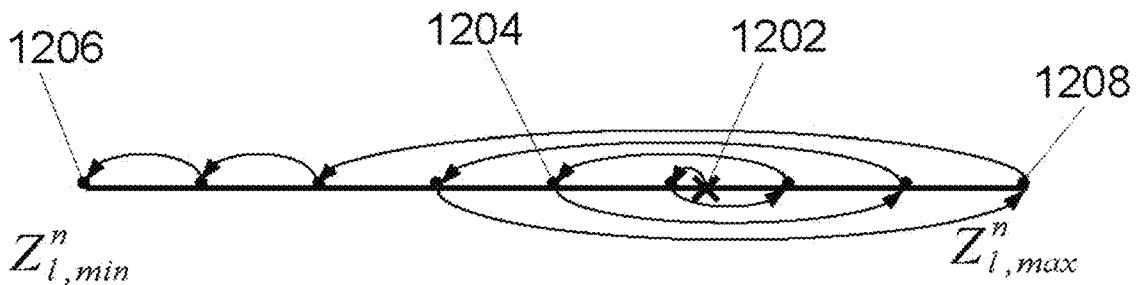
FIG. 12 is a schematic diagram of fast enumeration expansion of a real number system from near to far.

It should be understood that the above example methods and steps are described based on the real number system, the implementation of the present disclosure is not limited thereto. When the number of antennas is large, exemplarily ea complex K-best tree search system can be used to reduce the number of search layers. Referring to FIGS. 5 and 11, only the differences between the complex number system and the above steps are described below:

For step 510, the complex number system does not require the RVD.

For step 512, the channel matrix preprocessing in the complex number system can be carried out as follows.

Specifically referring to FIG. 11, in step 1102, MMSE extension is performed for a complex channel matrix $\overline{H}^n$ of the current subcarrier:

$$\underline{H}^n = \begin{bmatrix} \overline{H}^n \\ \delta \cdot \overline{I}_{N_{tx}} \end{bmatrix}.$$

$\overline{I}_M$ is a M×M-dimensional diagonal matrix with diagonal of 1.

In step 1104, sorted QR decomposition is performed for $\underline{H}^n$.

In step 1106, CLLL (complex LLL) lattice reduction is performed for a SQRD result $\underline{Q}^n\underline{R}^n\underline{P}^n$ to obtain a new lattice basis vector matrix.

In step 1108, an inverse matrix of the permutation matrix is solved.

In step 1110, an LR domain search boundary of each MIMO detection layer on a current $k^{th}$ subcarrier (a search range of a search variable of an LR domain) is solved. For the complex number system, the search variable in the LR domain is $$\bar{z}^n = (\underline{T}^n)^{-1} \frac{(\bar{x}^n + \bar{d})}{2}.$$

After the original M-QAM constellation points $\bar{x}^n$ are shifted and scaled, the value range changes. For the complex number system, the value range is recorded as $$\bar{s} = \frac{(\bar{x} + \bar{d})}{2}.$$

$s_l$ is a constellation element of the $l^{th}$ layer of vector $\bar{s}$, $s_l \in \Omega$. Then the upper boundary and the lower boundary of the LR domain element search of the $l^{th}$ layer of the $k^{th}$ subcarrier can be calculated by the following formulas.

$$z_{l,max}{}^n = \max(\Omega) \cdot \Sigma((\underline{T}^n)^{-1}[l])_+ + \min(\Omega) \cdot \Sigma((\underline{T}^n)^{-1}[l])_-;$$

$$z_{l,min}{}^n = \min(\Omega) \cdot \Sigma((\underline{T}^n)^{-1}[l])_+ + \max(\Omega) \cdot \Sigma((\underline{T}^n)^{-1}[l])_-.$$

Then the total number of LR domain searches of the $l^{th}$ layer of the $n^{th}$ subcarrier is $L_l{}^n = z_{l,max}{}^n - z_{l,min}{}^n + 1$.

Here, $L_l{}^n$, $z_{l,max}{}^n$ and $z_{l,min}{}^n$ are complex numbers, and represent the search range of a real part and imaginary part respectively.

The resulted $L_l{}^n$, $z_{l,max}{}^n$ and $z_{l,min}{}^n$ of all search layers of all subcarriers are stored for the MIMO detection of subsequent OFDM symbols of the current packet and generation of a global dynamic K-value table.

Returning to FIG. 5, in step 516, the dynamic K-value of each layer of the MIMO detection of the current subcarrier is obtained.

In step 526, LR domain K-best search, LR inverse mapping and LLR soft value generation are performed. As a non-limiting embodiment, the step 526 may be specifically implemented by the steps shown in FIG. 8. For the complex number system, in step 802 in FIG. 8, the reception vector $\bar{r}^n$ is shifted and scaled:

$$\bar{r}^k = \frac{(\bar{r}^k + \bar{H}^k \cdot \bar{d})}{2}.$$

Then a shifted and scaled MIMO channel transmission system can be written as:

$$\bar{r}^k = \bar{H}^k \cdot \bar{s} + \frac{\bar{n}}{2}.$$

In step 802, a matrix $\tilde{Q}^k$ obtained in step 1108 has a dimension of $(N_{rx} + N_{tx}) \times N_{tx}$. $\tilde{Q}^k$ can be split into:

$$\tilde{Q}^k = \begin{bmatrix} \tilde{Q}_1^k \\ \tilde{Q}_2^k \end{bmatrix}. \tilde{Q}_1^k$$

has a dimension of $N_{rx} \times N_{tx}$, and $\tilde{Q}_2^k$ has a dimension of $N_{tx} \times N_{tx}$.

The reception vector $\bar{r}^k$ shifted and scaled in step 802 is premultiplied by a conjugate transpose of $\tilde{Q}_1^k$ to obtain an input of a K-best MIMO detector in the complex number system: $\bar{y}^k = (\tilde{Q}_1^k)^H \cdot \bar{r}^k = \tilde{R}^k \cdot \bar{z} + \bar{\lambda}$.

$\bar{\lambda}$ is a sum vector of residual interference and noise, and can be expressed as:

$$\bar{\lambda} = -(\tilde{Q}_2^k)^H \cdot \delta \cdot \bar{I}_L \cdot \bar{s} + (\tilde{Q}_1^k)^H \cdot \frac{\bar{n}}{2}.$$

L is the number of layers of the K-best search in the MIMO detection. From the expression $\bar{\lambda}$, when SNR is large, the term $\bar{\lambda}$ can be ignored.

Correspondingly, $\bar{z}$ is a complex LR domain search vector.

For step 806, the basic steps of on-demand expansion K-best search are the same as those for the real number system, except that the on-demand expansion of each layer is a two-dimensional expansion of a complex integer field. Steps 808, 810 to 818 are the same as those for the real number system.

The Second Scenario

Different from the first scenario, in the second scenario, the system does not have sufficient time to perform the channel matrix preprocessing between obtaining the channel estimation result and performing the detection of the data part of the current packet. It should be understood that the method of the present disclosure may be based on a real number system or a complex number system. The real number system is described below as an example, but the implementation of the present disclosure is not limited thereto.

Figure 6:
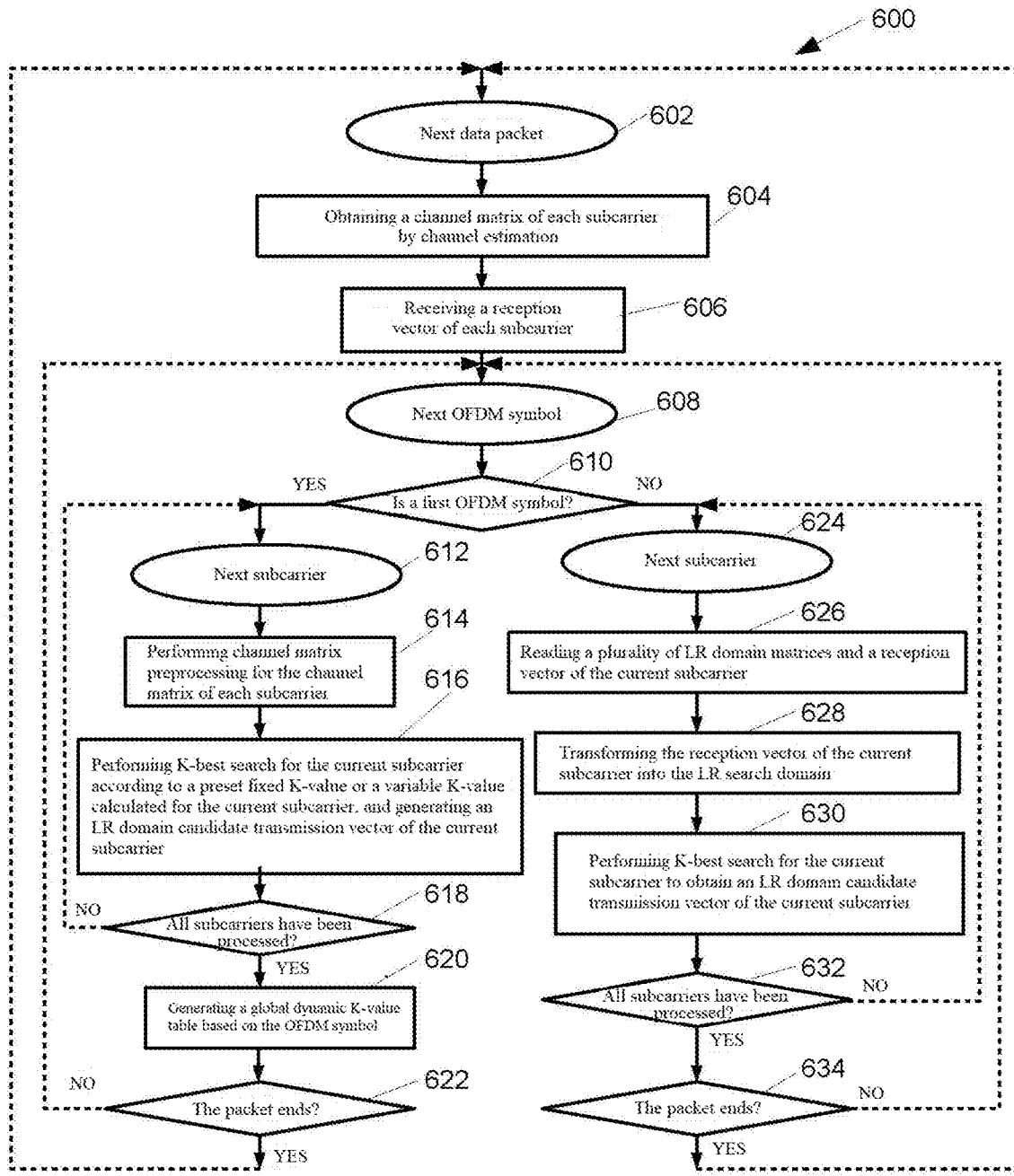
FIG. 6 is an overall flow chart of one embodiment of the method according to the present disclosure in a second scenario.

FIG. 6 shows an overall flow chart of one embodiment of the method according to the present disclosure in the second scenario. As shown in FIG. 6, a signal detection method 600 for a MIMO-OFDM wireless communication system according to the present disclosure includes processing a plurality of MIMO-OFDM data packets. Specifically, the method includes processing each MIMO-OFDM data packet of the plurality of MIMO-OFDM data packets one by one with starting from step 602.

In step 604, a channel matrix of each subcarrier is obtained by channel estimation. In step 606, a reception vector of each subcarrier is received.

Next, if a current OFDM symbol is determined to a first OFDM symbol in the MIMO-OFDM data packet in step 610, steps 612 to 620 are executed to perform MIMO detection processing for the first OFDM symbol in step 616, and the channel matrix preprocessing is performed for the channel matrix of each subcarrier of the first OFDM symbol in step 614 to generate a global dynamic K-value table in step 620. Specifically, the channel matrix preprocessing in step 614 includes performing decomposition and lattice reduction on the channel matrix of the current subcarrier to generate a plurality of LR domain matrices of the current subcarrier. In addition, the global dynamic K-value table generated in step 620 includes a global dynamic K-value corresponding to each search layer of each subcarrier.

Specifically, performing MIMO detection processing for the first OFDM symbol in step 616 includes performing the following steps for each subcarrier of the first OFDM symbol: performing K-best search for the current subcarrier according to a preset fixed K-value or a variable K-value calculated for the current subcarrier, and generating an LR domain candidate transmission vector of the current subcarrier.

Next, steps 624 to 632 are executed for each subsequent OFDM symbol in the MIMO-OFDM data packet to perform MIMO detection for the OFDM symbol, in which the MIMO detection includes performing the following steps for each subcarrier of the current OFDM symbol: in step 626, reading a plurality of LR domain matrices and a reception vectors of the current subcarrier; in step 628, the reception vector of the current subcarrier is transformed into an LR search domain; and in step 630, K-best search is performed for the current subcarrier to obtain an LR domain candidate transmission vector of the current subcarrier. A K-value applied to each search layer of the current subcarrier in the K-best search is a global dynamic K-value in the global dynamic K-value table corresponding to the search layer.

Different from the MIMO detection method in the prior art, the signal detection method of the present disclosure, such as the signal detection method 600, provides specially optimized channel matrix preprocessing for the MIMO-OFDM wireless communication system, fully considers frequency selective fading on the subcarriers, and dynamically allocates the K-value without increasing system search resources. In particular, in the second scenario, in the signal detection method of the present disclosure, the generation of the global dynamic K-value table is combined in the MIMO detection process of the first OFDM symbol in each MIMO-OFDM data packet, and the generated global dynamic K-value table is applied to the MIMO detection optimization of subsequent OFDM symbols in exchange for the detection optimization of most OFDM symbols with a small additional computation overhead, therefore, the detection performance is further improved under the constraint of limited system search resources.

Figure 7:
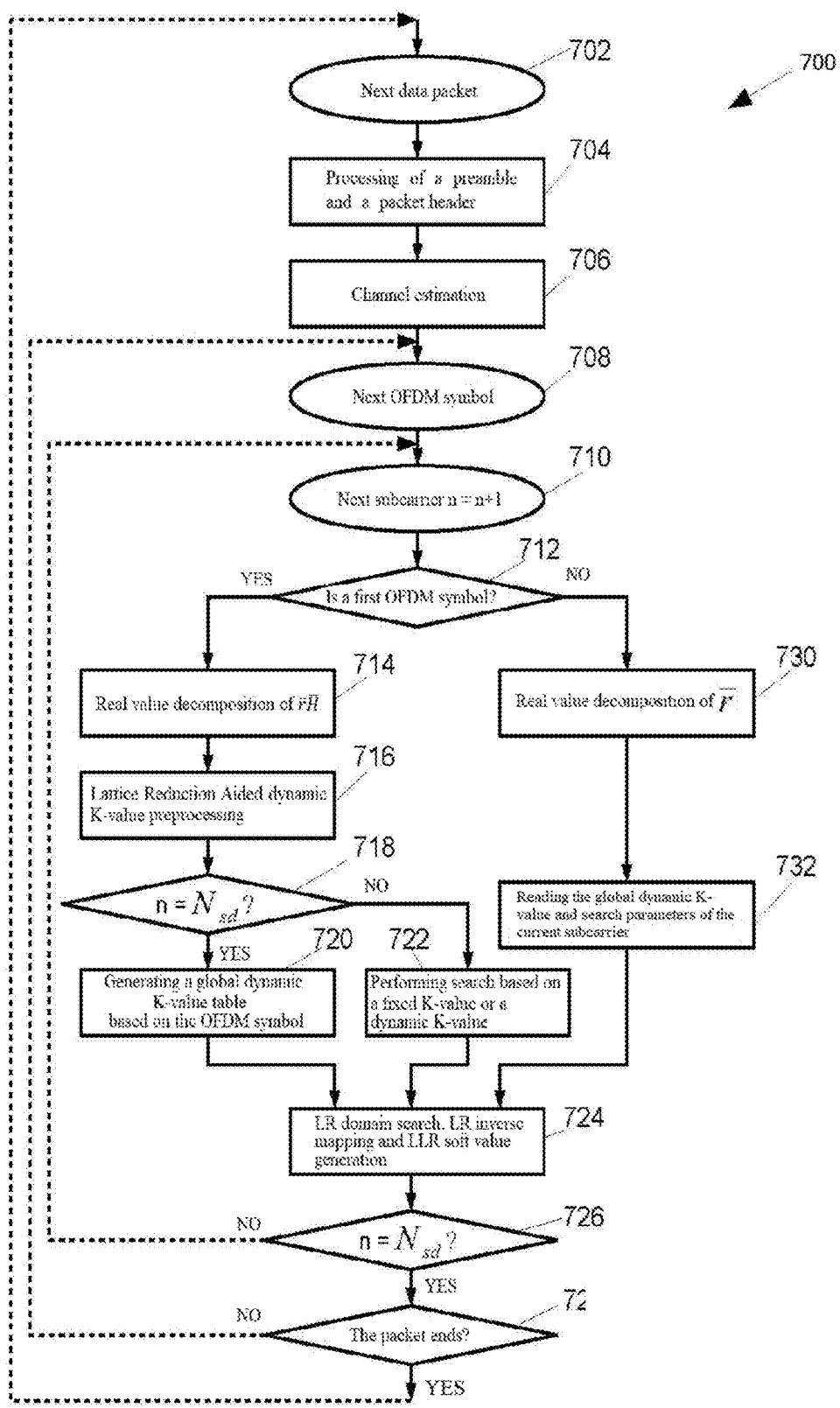
FIG. 7 is an overall flow chart of a more detailed embodiment of the method according to the present disclosure in the second scenario.

Details of the signal detection method of the present disclosure in the second scenario are described below in more detail with reference to FIG. 7. FIG. 7 shows an overall flow chart of a more detailed embodiment of the method according to the present disclosure in the second scenario. A signal detection method 400 shown in FIG. 7 starts with step 502 in which each MIMO-OFDM data packet in a plurality of MIMO-OFDM data packets is processed.

In step 704, a preamble and a packet header are processed.
In step 706, channel estimation is performed.
In step 708, cyclic processing of each OFDM symbol line in the current MIMO-OFDM data packet is started.
In step 712, whether the current OFDM symbol is the first OFDM symbol in the current MIMO-OFDM data packet or not is determined. If yes, a cycle from steps 714 to 726 and returning to steps 710 and 712 is cyclically performed until the MIMO detection of all subcarriers of the first OFDM symbol and the channel matrix preprocessing are completed.

In step 714, a RVD is performed for a complex number input to a MIMO detection system. Specifically, the RVD is performed for a receiving complex vector $\bar{r}^n$ and a channel complex matrix $\bar{H}^n$ of an $n^{th}$ subcarrier to generate $\bar{\bar{r}}^n$ and $\bar{\bar{H}}\bar{h}^n$. And a noise variance estimation vector $\bar{\delta}^2$ is split to double its dimension.

After the RVD, the transmission equation of the MIMO system is changed to be: $\bar{\bar{r}}^n = \bar{\bar{H}}\bar{h}^n \cdot \bar{\bar{x}}^n + \bar{\bar{n}}^n$ The RVD has different decomposition methods, and the present disclosure is not limited to any specific decomposition method.

In step 716, while the MIMO detection is performed for each subcarrier of a signal received in a first OFDM symbol period, the channel matrix of each subcarrier is preprocessed one by one. The channel matrix preprocessing described here may be performed in the same manner as step 512 in FIG. 5. For example, the channel matrix preprocessing may be performed according to the example method detailed with reference to FIG. 11. The channel matrix preprocessing will not be repeated here.

If all subcarriers have not been processed according to determination in step 718, step 722 is executed to perform the K-best search based on the fixed K-value or the dynamic K-value of the subcarriers.

In step 722, when a current OFDM symbol period is the first OFDM symbol period of receiving the current data packet, because the system has not completed the channel matrix preprocessing of all subcarriers, global dynamic K-value allocation based on OFDM symbols cannot be obtained, the dynamic K-value allocation of the first OFDM symbol therefore needs special processing. For example, the search K-value of the first OFDM symbol is fixed, or the first OFDM symbol search uses the dynamic K-value allocation based on subcarriers, etc.

Fixing the search K-value means that, when a system overall K-value is preset, the MIMO-OFDM detection system uniformly uses the system overall K-value in all search layers of all subcarriers without distinguishing and considering channel attenuation on each subcarrier or range differences between different search layers of a search vector on the same subcarrier in the LR domain.

The preset system overall K-value refers to the number of optimal (partial) candidate vectors retained in each search layer of a K-best tree search system as determined through simulation or experience on the premise of ensuring design objective of bit error ratio.

For example, the K-value of a 16 QAM real number search system is set as 6, that of a 64 QAM real number search system is set as 10, that of a 256 QAM real number search system is set as 16, etc.

The value of the preset system overall K-value depends on different system parameters (e.g., QAM constellation, the number of antennas, real/complex number system, etc.) and different MIMO K-best detection algorithms (normal K-best, SQRD, LRA, etc.). After the parameters and algorithms of the system are determined, the system overall K-value under the current setting is fixed.

During detection by the MIMO-OFDM system, when the system overall K-value is determined, the total system search expansion resource consumption is also determined, i.e., $K \times L \times N_{sd}$. L is the total number of MIMO detection layers of each subcarrier, $L=2N_{tx}$ is for a real number system, and $L=N_{tx}$ is for a complex number system.

The dynamic K-value allocation based on subcarriers means that after the system overall K-value is preset, the MIMO-OFDM detection system dynamically allocates all search resources $K \times L$ of the current subcarrier among the search layers by only considering the range difference of the search vector on the same subcarrier between different search layers in the LR domain instead of distinguishing and considering the channel attenuation on each subcarrier.

In step 718, if $n=N_{sd}$, the first OFDM symbol period ends and the channel matrix preprocessing of all subcarriers ends, step 720 can be executed to obtain the dynamic K-value of each layer of the MIMO detection of the current subcarrier to generate a global dynamic K-value table based on all subcarriers of the OFDM symbols. Then, step 724 is executed to perform LR domain search, LR inverse mapping and LLR soft value generation.

It should be understood that the K-best search expansion mode of the present disclosure is exemplarily on-demand expansion with the highest expansion efficiency, and the complexity and time consumption of the MIMO detection search are mainly determined by the K-value of an optimal candidate path retained by each layer. However, those skilled in the art should understand that the implementation of the present disclosure is not limited thereto. On the contrary, the global dynamic K-value table of the present disclosure can be applicable to different K-best search expansion modes.

It can be known from step 1100 that different channel conditions of various subcarrier and great difference in permutation matrix $\underline{T}^n$ result in great fluctuation in the search range $L_l^n$ between different subcarriers and between different search layers of the same subcarrier.

Therefore, using a fixed K-value will cause corresponding search layers of some subcarriers with poor channel conditions/large search range to lose the probability of finding an optimal point, thus reducing the reliability of subsequent LLR soft value generation, such that dramatically reducing the coding and decoding gain and causing an error floor occurs in reception performance (e.g., see FIGS. 16A and 16B and corresponding description below).

According to the present disclosure, on the premise of ensuring that total resource consumption of the search expansion of the MIMO detection system is fixed, the total resource of the search expansion of the MIMO detection system is reasonably allocated among the subcarriers and among the search layers of the subcarriers, which means that, on the one hand, speed of the MIMO detection and throughput of the system are fixed, on the other hand, optimal performance of the system detection under the current system overall K-value setting is guaranteed.

The premise of the above fixed search expansion resource allocation is only a consideration in practical application, and the method of the present disclosure is not limited by this premise.

For subcarrier transmission systems with poor channel conditions, after LR domain transform, an LR domain search range is expanded relative to an original constellation domain, and more search expansion resources are allocated accordingly, that is, the search K-value of the relevant layer is increased accordingly. For subcarrier transmission systems with good channel conditions, after the LR domain transform, the LR domain search range changes little compared with the original constellation domain, and the allocated search expansion resources can be reduced accordingly, that is, the search K-value of the relevant layer can be reduced accordingly.

That is, the search resources need to be globally and dynamically allocated in all subcarriers and all search layers of the OFDM according to system conditions.

Specifically, many allocation methods are available for the LR domain search expansion resources, including but not limited to the following methods:

a. According to different channel conditions:

For the most common frequency selective channel, global search expansion resource allocation at all subcarriers and all search layers based on OFDM symbol is used, that is, a global dynamic K-value table based on OFDM symbol is generated to aid the MIMO-OFDM detection.

For a flat fading channel or an approximately flat fading channel, the aforementioned simple dynamic K-value allocation based on subcarriers is used.

Alternatively, the search resources can be divided into M parts, the subcarriers of the OFDM symbol can be divided into m groups, and the search expansion resources are allocated between the subcarriers and layers of the same group.

b. According to requirements of system detection performance and allocation strategy resource consumption:

For a system with high detection performance requirements and insensitive to consumption of computing resources, a high-precision allocation strategy can be used.

For a system with margin for detection performance and sensitive to the consumption of the computing resources, a simple K-value hierarchical allocation can be used, such as strategies of simply setting two search range thresholds and dividing dynamic change of the K-value into three levels.

c. According to different search weights:

Generally, underlying search is of high importance. Failing to allocate sufficient search resources will cause subsequent error diffusion and increase deviation of an LLR value. Therefore, allocation weight of the search resources at a lower layer can be increased, and the search resources are tilted to the lower layer when the search range is the same, so as to achieve the best system performance.

Complexity analysis: The dynamic allocation of the K-value search expansion resources in the present disclosure is only carried out once in the most front-end preprocessing process of the MIMO detection of each received packet. Alternatively, for time-varying channels, the system needs to perform channel estimation once in each channel coherence time period to generate a new channel matrix. Therefore, each channel estimation requires channel preprocessing and dynamic allocation of K-value.

However, compared with the whole MIMO-OFDM detection operation, operation cost of the channel preprocessing and the dynamic allocation of the K-value is very low and can be ignored. Compared with the paid operation cost, application of the dynamic allocation of K-value can make a search path of the system more reasonable and the soft value generation more reliable and the channel coding and decoding gain can be fully exploited under different channel conditions, thus the receiving performance of the system will be greatly improved. Therefore, regardless of the time-varying channels or the non-time-varying channels, and regardless of in the first scenario or in the second scenario, the method and system disclosed in the present disclosure can exchange a small additional computation overhead for a large optimization of the OFDM symbol detection, and further improve the detection performance under the constraint of limited system search resources.

If the current OFDM symbol is determined to be not the first OFDM symbol of the currently received data packet in step 712, the channel matrix preprocessing and the global dynamic K-value allocation based on OFDM symbols have been completed, and the MIMO detector can directly read the stored channel matrix preprocessing result of the $n^{th}$ subcarrier and the K-value vector $\overline{K}^n=[K_1^n\ K_2^n\ \ldots\ K_L^n]$ in the global dynamic K-value table of the current $n^{th}$ subcarrier in step 732 for performing subsequent MIMO detection in step 724.

For a real number system, step 730 is executed before step 732 to perform the RVD for the reception vector $\overline{r}^n$. For a complex number system, step 730 may be omitted.

In step 724, LR domain k-best search, LR inverse mapping and LLR soft value generation are performed. The MIMO detection operation executed in step 724 may be performed in the same manner as step 526 in FIG. 5. For example, the MIMO detection operation may be performed according to the example method detailed with reference to FIG. 8. The MIMO detection operation will not be repeated here.

The LLR soft value generated in step 724 can be processed by a proper clipping algorithm, sent to a subsequent stream inverse parser module, and then sent to a channel decoder for decoding. Those skilled in the art should understand that the LLR soft value generated by the method and system according to the present disclosure can be processed and decoded in a conventional manner in the art.

Figure 15:
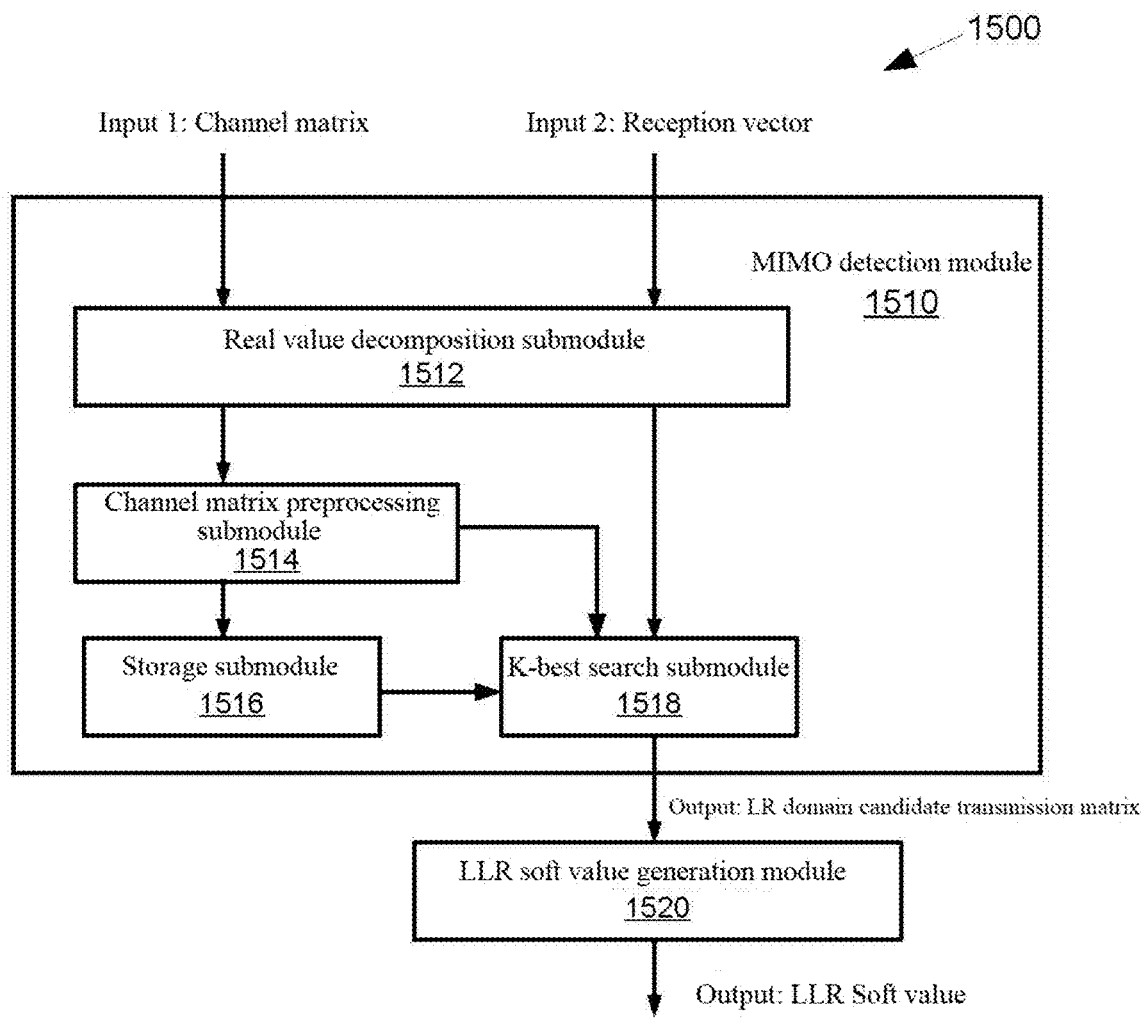
FIG. 15 is a schematic block diagram of a signal detection system for a MIMO-OFDM wireless communication system according to one embodiment of the present disclosure.

FIG. 15 is a schematic block diagram of a signal detection system 1500 for a MIMO-OFDM wireless communication system according to one embodiment of the present disclosure. The system 1500 includes a MIMO detector module 1510 for detecting a plurality of MIMO-OFDM data packets. The MIMO detector module may further include a channel matrix preprocessing submodule 1514, a storage submodule 1516, and a K-best search submodule 1518.

As shown in FIG. 15, the MIMO detector module 1510 is configured to receive a channel matrix of each subcarrier obtained by channel estimation and a reception vector of each subcarrier. It should be understood that the channel matrix preprocessing submodule 1514 and the K-best search submodule 1518 may be configured to be implemented to perform the MIMO detection methods according to the present disclosure in the first scenario and/or the second scenario.

In one embodiment in the first scenario, the MIMO detector module 1512 may be configured to receive the channel matrix of each subcarrier obtained by channel estimation and the reception vector of each subcarrier as input.

The channel matrix preprocessing submodule 1514 may be configured to perform channel matrix preprocessing for the channel matrix of each subcarrier to generate a global dynamic K-value table, in which the channel matrix preprocessing includes performing decomposition and lattice reduction for the channel matrix of a current subcarrier to generate a plurality of LR domain matrices of the current subcarrier, and in which the global dynamic K-value table includes a global dynamic K-value corresponding to each search layer of each subcarrier The storage submodule 1516 may be configured to store the global dynamic K-value table and search parameters for each subcarrier.

The K-best search submodule 1518 may be configured to perform MIMO detection for each OFDM symbol in the MIMO-OFDM data packet, in which the MIMO detection includes performing the following steps for each subcarrier of the current OFDM symbol: reading a plurality of LR domain matrices and a reception vector of the current subcarrier; transforming the reception vector of the current subcarrier into an LR search domain; and performing K-best search for the current subcarrier to obtain an LR domain candidate transmission vector of the current subcarrier. In the K-best search, the K-value applied to each search layer of the current subcarrier is a dynamic K-value corresponding to the search layer in the global dynamic K-value table. The K-best search submodule 1518 may also be configured to output the LR domain candidate transmission vector of the current subcarrier.

In one embodiment in the second scenario, the MIMO detector module 1512 may be configured to perform MIMO detection processing for a first OFDM symbol in the MIMO-OFDM data packet, and the channel matrix preprocessing submodule 1514 may be configured to perform channel matrix preprocessing for the channel matrix of each subcarrier of the first OFDM symbol to generate the global dynamic K-value table, in which the channel matrix preprocessing includes performing decomposition and lattice reduction for the channel matrix of the current subcarrier to generate a plurality of LR domain matrices of the current subcarrier, in which the global dynamic K-value table includes the global dynamic K-value corresponding to each search layer of each subcarrier, and performing MIMO detection processing for the first OFDM symbol includes performing the following steps for each subcarrier of the first OFDM symbol: performing K-best search for the current subcarrier according to a preset fixed K-value or a variable K-value calculated for the current subcarrier, and generating an LR domain candidate transmission vector of the current subcarrier.

The storage submodule 1516 is configured to store the global dynamic K-value table and search parameters for each subcarrier.

The K-best search submodule may be configured to perform MIMO detection for each subsequent OFDM symbol in the MIMO-OFDM data packet, in which the MIMO detection includes performing the following steps for each subcarrier of the current OFDM symbol: reading a plurality of LR domain matrices and a reception vector of the current subcarrier; transforming the reception vector of the current subcarrier into an LR search domain; and performing K-best search for the current subcarrier to obtain an LR domain candidate transmission vector of the current subcarrier. In the K-best search, the K-value applied to each search layer of the current subcarrier is a global dynamic K-value corresponding to the search layer in the global dynamic K-value table.

The MIMO detector module 1510 optionally includes a real value decomposition submodule 1512. The real value decomposition submodule 1512 may be configured to perform real value decomposition for the channel matrix of each subcarrier before the channel matrix preprocessing. And the K-best search submodule may also be configured to perform real value decomposition for the reception vector before performing the K-best search for the current subcarrier.

Optionally, the system 1500 also includes an LLR soft value generation module 1516 which receives all LR domain candidate transmission vectors of the current subcarrier from the MIMO detector module and generates corresponding LLR soft values according to the soft value generation methods described above.

Technical improvements provided by the present disclosure include but are not limited to the channel matrix preprocessing, generation of the global dynamic K-value table, on-demand expansion of the K-best MIMO detector, scattered sorting, reuse of the discard path and use of the bit distance table.

The channel matrix preprocessing and the generation of the global dynamic K-value table generally need to be carried out only once at the start of the MIMO detection of each received packet, which has little impact on the detection overhead of the whole system.

In the meantime, the MIMO detection of a lattice reduction (LR) domain is used to make a decision boundary of a MIMO transmission vector close to the optimum. A search process in the LR domain makes full use of near orthogonalization of a search direction to improve search efficiency. For large constellation modulation applications, such as 256 QAM and 1024 QAM, the gain is especially dramatical.

In addition, in the channel matrix preprocessing stage, different ranges of search expansion of each layer of each subcarrier instead of the general continuous LR domain search are determined according to the channel conditions which therefore improves the search efficiency and provides conditions for application of fast enumeration expansion in subsequent K-best detection.

Moreover, in the present disclosure, total search expansion resources of the system are properly allocated by search expansion range information obtained by the preprocessing to optimize the search process with the same complexity, thus optimizing the generation of the LLR soft value and further maximizing the channel coding gain.

Figure 16A:
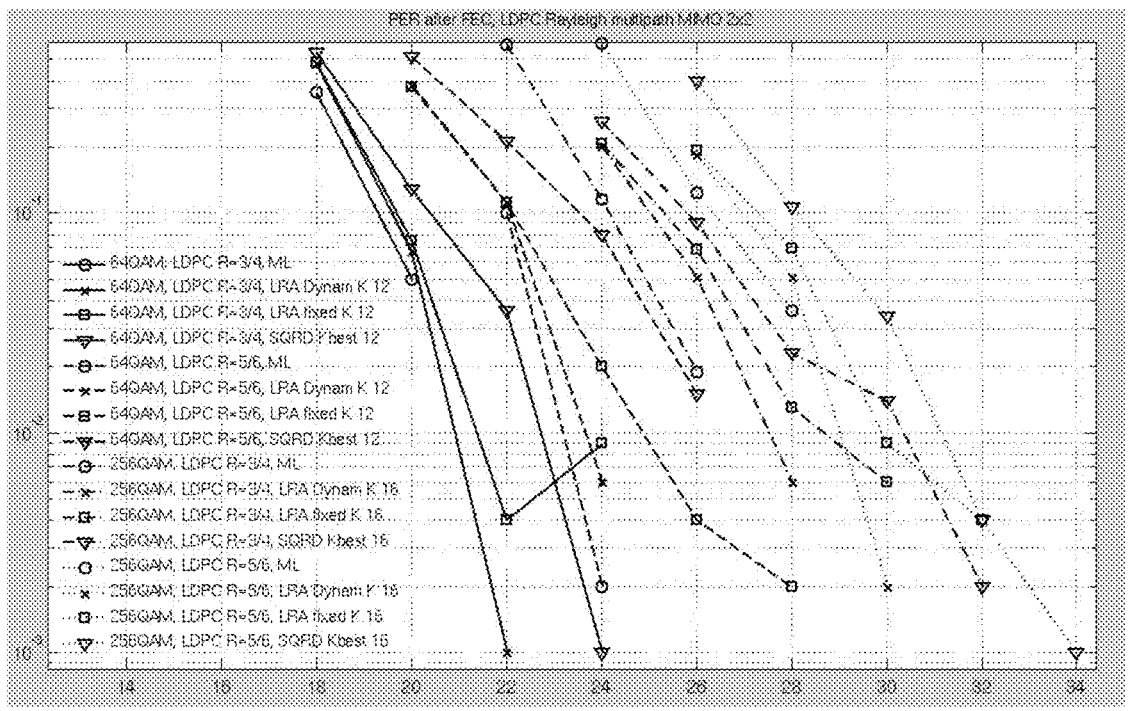
FIGS. 16A and 16B illustrate curves of performance comparison between the MIMO detection method according to the present disclosure and a MIMO detection method in the prior art.
Figure 16B:
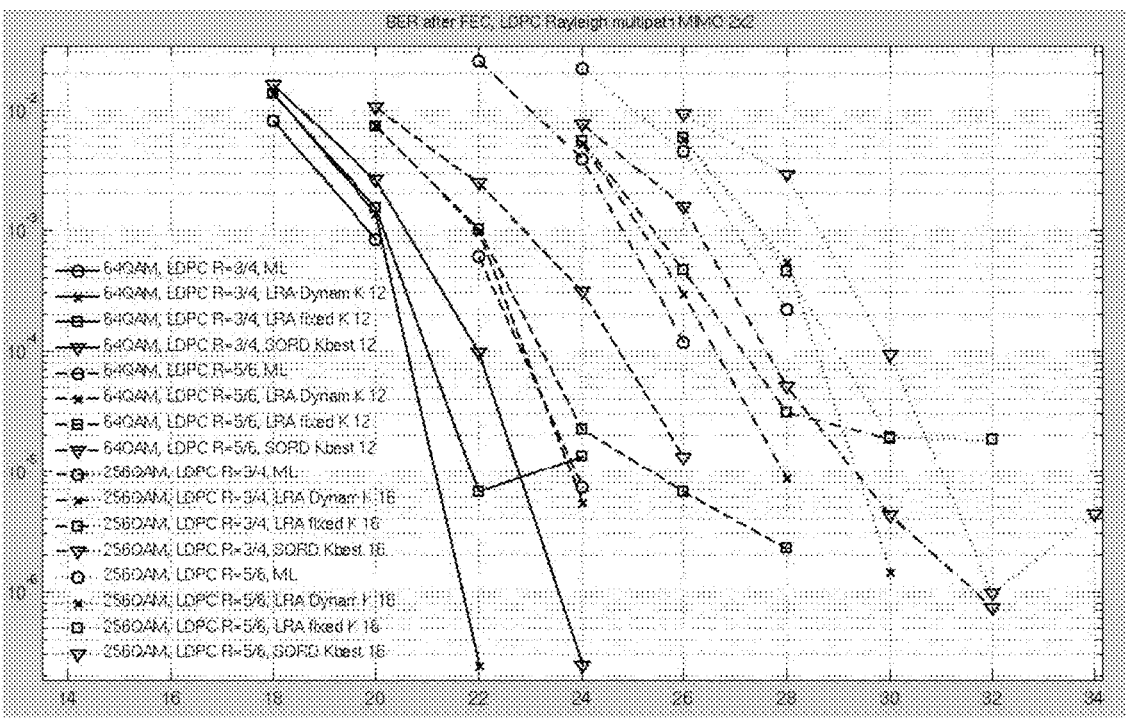

FIGS. 16A and 16B show curves comparing performances between the MIMO detection method according to the present disclosure and a MIMO detection method in the prior art. Specifically, the transverse axis of FIG. 16A denotes an SNR value (dB) of a receiving end, and the longitudinal axis denotes a packet error rate (PER). The transverse axis of FIG. 16B denotes an SNR value (dB) of a receiving end, and the longitudinal axis denotes a bit error ratio (BER).

It can be known from FIGS. 16A and 16B, when a preset system overall K-value is 12 at 64 QAM and 16 at 256 QAM, the BER curve and PER curve corresponding to the LRA MIMO detection of global dynamic K based on OFDM symbols of the present disclosure are close to the performance of the maximum likelihood (ML) detection curve. In FIG. 16B, the SNR loss of BER=10e-5 is within 1 dB in the case of multiple QAM constellations and LDPC coding and decoding rates.

As shown in FIG. 16A and FIG. 16B, according to the BER and PER curves of the LRA fixed K-value MIMO detection of the prior art, when the SNR is large, the large bit error probability still exists, that is, the error floor may occur. The Error floor is a phenomenon that seriously affects the system performance, and should be avoided in the system design.

If the idea of the present disclosure is not used, in order to solve the aforementioned problem and make the performance close to that achieved in the embodiments of the present, the system overall K-value in the conventional detection method should be largely, for example, the system overall K-value may be set to 20-24 at 64QAM and to 36-40 at 256QAM, which greatly increases detection complexity of the system.

It should be pointed out that increasing the K-value will cause the performance of the LRA K-best detection with an allocated global dynamic K-value and the LRA K-best detection with a fixed K-value to approach the maximum likelihood (ML) detection curve.

Therefore, the coded MIMO-OFDM detector in the present disclosure can approach the performance of the ML detection in the case of small K-value and low complexity, and detection complexity increases almost linearly with the number of M-QAMs and antennas, and thus has a higher practical application value.

Some embodiments of the global dynamic K-value allocation in the present disclosure are further described below.

A 2×216 QAM $N_{sd}$=48 MIMO-OFDM K-best real number detection system is taken as an example for description. Assuming that a preset system overall K-value is 3, the number of search layers of the real number system is 4, the system has normal 16 QAM constellation domain, and the number of candidate expansions for each real number search layer is 4. The total search expansion resources of the system are $K \times L \times N_{sd}$=3×4×48.

Embodiment 1

Global dynamic K-value allocation based on OFDM symbols.

After preprocessing of $N_{sd}$=48 channel matrices loaded with data in OFDM symbols is completed, a search range $L_l^n$ of each search layer of each subcarrier can be determined. The total number of points in the search range is:

$$L_{sum} = \Sigma_{n=1}^{N_{sd}} \Sigma_{l=1}^{L} L_l^n.$$

If fine linear allocation is made, a global dynamic K-value of an $l^{th}$ layer of an $n^{th}$ subcarrier can be calculated as follows:

$$K_l^n = \text{round}\left[ \frac{K \cdot L \cdot N_{sd}}{L_{sum}} \cdot L_l^n \right]$$

Embodiment 2

Simple hierarchical (secondary) allocation.

Medians $L_{mid}$ of all $L_l^n$ are found and an offset $K_\delta < K-1$ of the system overall K-value is set.

If $L_l^n \geq L_{mid}$, then $K_l^n = K + K_\delta$; If $L_l^n < L_{mid}$, then $K_l^n = K - K_\delta$ Embodiment 3

Subcarriers are grouped and the K-value is dynamically allocated within the group.

For example, 48 subcarriers are divided into four groups, and the search resources in each group are allocated. If each subcarrier is a group, it is the aforementioned dynamic K-value allocation based on subcarriers.

Embodiment 4

Weighted allocation.

A process of a K-best tree search is from bottom to top (the $L^{th}$ layer to the first layer). Therefore, if any error occurs to the result at the start of the search, the error will diffuse and accumulate to subsequent layers. When the K-value is dynamically allocated globally, an allocation weight of an initial layer can be increased to tilt the search resources to the initial layer.

The above embodiments illustrate specific operation process by way of example, but it should be understood that the protection scope of the present disclosure is not limited thereto.

Although various embodiments in different aspects of the present disclosure have been described for the purpose of the present, it should not be understood that teachings of the present are limited thereto. The features disclosed in one embodiment are not limited thereto but may be combined with features disclosed in other embodiments. For example, one or more features and/or operations of the MIMO detection method and system according to the present disclosure described in the first scenario can also be applied alone, in combination or as a whole to the MIMO detection method and system according to the present disclosure described in the second scenario, and vice versa. In addition, it should be understood that the above-said method steps can be executed sequentially or in parallel, combined into fewer steps, divided into additional steps, or combined in a different way than that described herein and/or eliminated. The modules and/or units described above can also be combined into larger modules, split into more modules, combined in a different manner from the above, and/or omitted. It should be understood by those skilled in the art that the present disclosure includes more possible alternative embodiments and variations, and various changes and modifications can be made to the above-said components and structures without departing from the scope defined by the claims of the present disclosure.

The invention claimed is:

1. A signal detection method for a Multiple-Input Multiple-Output Orthogonal Frequency Division Multiplexing (MIMO-OFDM) wireless communication system, comprising processing a plurality of MIMO-OFDM data packets, the method comprises the following steps:
   performing the following steps for each of the plurality of MIMO-OFDM data packets:
   performing channel estimation to obtain a channel matrix of each subcarrier;
   receiving a reception vector of each subcarrier;
   performing MIMO detection for a first OFDM symbol in a MIMO-OFDM data packet and channel matrix preprocessing for the channel matrix of each subcarrier in the first OFDM symbol to generate a global dynamic K-value table, wherein the channel matrix preprocessing comprises performing decomposition and lattice reduction for the channel matrix of a current subcarrier to generate a plurality of Lattice Reduction (LR) domain matrices of the current subcarrier, and wherein the global dynamic K-value table comprises a global dynamic K-value corresponding to each search layer of each subcarrier, wherein performing MIMO detection for the first OFDM symbol comprising performing the following steps for each subcarrier of the first OFDM symbol: performing K-best search for the current subcarrier according to a preset fixed K-value or a variable K-value calculated for the current subcarrier, and generating a LR domain candidate transmission vector of the current subcarrier;
   performing MIMO detection for each subsequent OFDM symbol in the MIMO-OFDM data packet, wherein the MIMO detection comprises performing the following steps for each subcarrier of a current OFDM symbol:
   reading the plurality of LR domain matrices and a reception vector of the current subcarrier;
   transforming the reception vector of the current subcarrier into a LR search domain; and
   performing the K-best search for the current subcarrier to obtain the LR domain candidate transmission vector of the current subcarrier, wherein a K-value applied to each search layer of the current subcarrier in the K-best search is a global dynamic K-value in the global dynamic K-value table corresponding to the search layer.

2. The signal detection method according to claim 1, wherein the step of performing channel matrix preprocessing for the channel matrix of each subcarrier further comprises generating search parameters for each subcarrier, wherein the search parameters comprise a LR domain search upper boundary and a LR domain search lower boundary corresponding to each search layer of each subcarrier; and
   the step of performing K-best search for the current subcarrier further comprises applying the LR domain search upper boundary and the LR domain search lower boundary corresponding to the search layer in the search parameters to each search layer of the current subcarrier in the K-best search.

3. The signal detection method according to claim 1, wherein if the MIMO-OFDM wireless communication system is configured to be a real number system, the channel matrix of each subcarrier is decomposed into real values before the channel matrix preprocessing, and the reception vector is decomposed into real values before the K-best search of the current subcarrier.

4. The signal detection method according to claim 1, wherein the step of performing decomposition and lattice reduction for the channel matrix of the current subcarrier comprises performing Minimum Mean Square Error (MMSE) expansion and sorted QR decomposition for the channel matrix of the current subcarrier to obtain a unitary matrix, an upper triangular matrix and a permutation matrix, and
   performing Lenstra-Lenstra-Lovasz (LLL) lattice reduction for the unitary matrix, the upper triangular matrix and the permutation matrix to generate the multiple LR domain matrices, wherein the multiple LR domain matrices comprise a lattice unitary matrix, a lattice upper triangular matrix and a lattice permutation matrix.

5. The signal detection method according to claim 4, wherein the step of transforming the reception vector of the current subcarrier to the LR search domain comprises shifting and scaling the reception vector, and multiplying the shifted and scaled reception vector by a conjugate transpose of the lattice unitary matrix to obtain a reception vector in a LR domain.

6. The signal detection method according to claim 2, wherein the LR domain search upper boundary and the LR domain search lower boundary are obtained in the following manner:
   for the LR domain search upper boundary of a $l^{th}$ search layer of a $n^{th}$ subcarrier:
   $$z_{l,max}{}^n = \max(\Omega) \cdot \Sigma((\underline{T}'')^{-1}[l])_+ + \min(\Omega) \cdot \Sigma((\underline{T}'')^{-1}[l])_-;$$
   for the LR domain search lower boundary of the th search layer of the $n^{th}$ subcarrier:
   $$z_{l,min}{}^n = \min(\Omega) \cdot \Sigma((\underline{T}'')^{-1}[l])_+ + \max(\Omega) \cdot \Sigma((\underline{T}'')^{-1}[l])_-;$$
   wherein $\Omega$ is a domain of a constellation element of the $l^{th}$ search layer; matrix $(\underline{T}'')^{-1}$ is an inverse matrix of the lattice permutation matrix obtained from the LLL lattice reduction; $(\underline{T}'')^{-1}[l]$ is a th row of the matrix $(\underline{T}'')^{-1}$; $((\underline{T}'')^{-1}[l])_+$ is a positive element in the $l^{th}$ row of the matrix $(\underline{T}'')^{-1}$; and $((\underline{T}'')^{-1}[l])$ is a negative element in the $l^{th}$ row of the matrix $(\underline{T}'')^{-1}$.

7. The signal detection method according to claim 1, wherein the global dynamic K-value corresponding to each search layer of each subcarrier is determined according to any of the following steps or a combination of multiple steps:
   (1) increasing the global dynamic K-value corresponding to the search layer of the subcarrier with poor channel conditions;
   (2) assigning a weight to the global dynamic K-value corresponding to each search layer of each subcarrier, wherein a larger weight is assigned to the global dynamic K-value corresponding to the search layer closer to an initial search layer; and
   (3) grouping the subcarriers, and determining the global dynamic K-value corresponding to each search layer of each subcarrier for the subcarriers in the group.

8. The signal detection method according to claim 6, wherein the global dynamic K-value corresponding to each search layer of each subcarrier is determined according to any of the following steps or a combination of multiple steps:
   (1) increasing the global dynamic K-value corresponding to the search layer of the subcarrier with poor channel conditions;
   (2) assigning a weight to the global dynamic K-value corresponding to each search layer of each subcarrier, wherein a larger weight is assigned to the global dynamic K-value corresponding to the search layer closer to an initial search layer;
(3) grouping the subcarriers, and determining the global dynamic K-value corresponding to each search layer of each subcarrier for the subcarriers in the group;
(4) taking the global dynamic K-value corresponding to each search layer of each subcarrier as a positive integer positively related to a search range size of each search layer; and
(5) segmenting the search range size of all search layers of each subcarrier, and assigning a corresponding global dynamic K-value to each segment of the search range size, so that a segment with a larger search range corresponds to a larger global dynamic K-value,
wherein the search range size of each search layer is determined according to the following formula:

$$L_l^n = z_{l,max}^n - z_{l,min}^n + 1.$$

9. The signal detection method according to claim 1, wherein the step of performing K-best search for the current subcarrier comprising:
for a top layer in a K-best search tree of the current subcarrier, performing quick enumeration expansion from near to far from an initial point to obtain all candidate output partial vectors of an initial search layer, wherein a number of all candidate output partial vectors of the initial search layer is the global dynamic K-value corresponding to the initial search layer, and calculating a partial Euclidean distance between the candidate output partial vectors and a partial reception vector of the initial search layer;
for each search layer in the K-best search tree except the top layer, performing the following expansion steps:
determining an initial point in a current search layer according to each candidate output partial vector of a previous layer, and performing an independent expansion from each initial point;
(a) in each independent expansion, expanding a first child node from the initial point;
(b) in a partial candidate vector set corresponding to the expanded child node, selecting a partial candidate vector with a minimum partial Euclidean distance as a candidate output partial vector of the current search layer;
(c) extracting the partial candidate vector with the minimum Euclidean distance from the partial candidate vector set;
(d) expanding from the child node corresponding to the partial candidate vector with the minimum partial Euclidean distance to obtain a next child node of the current search layer, and supplementing the partial candidate vector corresponding to the next child node to the partial candidate vector set;
(e) repeating steps (b) to (d) until all candidate output partial vectors of the current search layer are obtained, wherein the number of all candidate output partial vectors of the current search layer is the global dynamic K-value corresponding to the current search layer; and
obtaining all LR domain candidate transmission vectors of the current subcarrier when a search for an underlying layer in the K-best search tree is completed, and finishing the K-best search for the current subcarrier.

10. The signal detection method according to claim 9, wherein a suboptimal LR domain candidate transmission vector discarded in the current search layer of the current subcarrier is expanded layer by layer down to a first search layer, but only the first child node is expanded to obtain the suboptimal LR domain candidate transmission vector, and the suboptimal LR domain candidate transmission vector is added to all LR domain candidate transmission vectors of the current subcarrier.

11. The signal detection method according to claim 1, wherein a bit distance table of the current subcarrier is created for the current subcarrier, wherein for each bit of a Quadrature Amplitude Modulation (QAM) symbol of each transmitting antenna, the bit distance table comprises a minimum partial Euclidean distance in all LR domain candidate transmission vectors whose current bit is 0 and a minimum partial Euclidean distance in all LR domain candidate transmission vectors whose current bit is 1.

12. The signal detection method according to claim 11, further comprising:
transforming all LR domain candidate transmission vectors of the current subcarrier into candidate transmission vectors of an original constellation domain;
determining whether all elements in a candidate transmission vector of the original constellation domain are legal constellation points, if yes, retaining the candidate transmission vector and a partial Euclidean distance of the original constellation, and if not, discarding the candidate transmission vector of the original constellation domain; and
performing M-QAM constellation point inverse mapping for all constellation points in the retained legal candidate transmission vector of the original constellation domain to obtain an inversely mapped bit sequence.

13. The signal detection method according to claim 12, wherein each bit in the inversely mapped bit sequence is compared with a corresponding position in the bit distance table, if the current bit is 0 and the partial Euclidean distance of the current bit is less than the corresponding minimum partial Euclidean distance in the bit distance table, the corresponding minimum partial Euclidean distance in the bit distance table is updated with the partial Euclidean distance of the current bit, and if the current bit is 1 and the partial Euclidean distance of the current bit is less than the corresponding minimum partial Euclidean distance in the bit distance table, the corresponding minimum partial Euclidean distance in the bit distance table is updated with the partial Euclidean distance of the current bit.

14. The signal detection method according to claim 13, wherein the bit distance table is used to calculate a Logarithm Likelihood Ratio (LLR) soft value of a corresponding bit:

$$LLR(b_{i,t}) = PED_{min,0} - PED_{min,1}$$

where $b_{i,t}$ is a $t^{th}$ bit of a QAM symbol of an $i^{th}$ transmitting antenna;
$PED_{min,0}$ is a minimum partial Euclidean distance value of all candidate transmission vectors whose bit $b_{i,t}$ is 0; and
$PED_{min,1}$ is a minimum partial Euclidean distance value of all candidate transmission vectors whose bit $b_{i,t}$ is 1.

15. The signal detection method according to claim 4, wherein for a complex number system, the LLL lattice reduction is the LLL lattice reduction of a complex number domain.

16. A signal detection system for a Multiple-Input Multiple-Output Orthogonal Frequency Division Multiplexing (MIMO-OFDM) wireless communication system, comprising a MIMO detector module for detecting a plurality of MIMO-OFDM data packets, characterized in that the MIMO detector module comprises a channel matrix preprocessing submodule, a storage submodule and a K-best search submodule:
    the MIMO detector module is configured to receive a channel matrix of each subcarrier obtained by channel estimation and a reception vector of each subcarrier as input;
    the MIMO detector module is configured to perform MIMO detection for a first OFDM symbol in a MIMO-OFDM packet, and the channel matrix preprocessing submodule is configured to perform channel matrix preprocessing for the channel matrix of each subcarrier in the first OFDM symbol to generate a global dynamic K-value table, wherein the channel matrix preprocessing submodule comprises performing decomposition and lattice reduction for the channel matrix of a current subcarrier to generate a plurality of LR domain matrices of the current subcarrier, and wherein the global dynamic K-value table comprises a global dynamic K-value corresponding to each search layer of each subcarrier, and wherein performing MIMO detection for the first OFDM symbol comprising performing the following steps for each subcarrier of the first OFDM symbol: performing K-best search for the current subcarrier according to a preset fixed K-value or a variable K-value calculated for the current subcarrier, and generating a LR domain candidate transmission vector of the current subcarrier;
    the storage submodule is configured to store the global dynamic K-value table and search parameters for each subcarrier;
    the K-best search submodule is configured to perform MIMO detection for each subsequent OFDM symbol in the MIMO-OFDM data packet, wherein the MIMO detection comprises performing the following steps for each subcarrier of a current OFDM symbol:
    reading the plurality of LR domain matrices and a reception vector of the current subcarrier;
    transforming the reception vector of the current subcarrier into a LR search domain; and
    performing the K-best search for the current subcarrier to obtain the LR domain candidate transmission vector of the current subcarrier, wherein a K-value applied to each search layer of the current subcarrier in the K-best search is the global dynamic K-value in the global dynamic K-value table corresponding to the search layer.

17. The signal detection system according to claim 16, wherein the channel matrix preprocessing submodule further comprises a Minimum Mean Square Error (MMSE) expansion unit configured to perform MMSE extension for the channel matrix of the current subcarrier, a sorted QR decomposition unit configured to perform sorted QR decomposition for the channel matrix of the current subcarrier and a Lenstra-Lenstra-Lovasz (LLL) lattice reduction unit configured to perform LLL lattice reduction for the channel matrix of the current subcarrier to generate a plurality of LR domain matrices,
    wherein the sorted QR decomposition generates a unitary matrix, an upper triangular matrix and a permutation matrix, the LLL lattice reduction comprises performing the LLL lattice reduction for the unitary matrix, the upper triangular matrix and the permutation matrix to generate the plurality of LR domain matrices, wherein the plurality of LR domain matrices comprise a lattice unitary matrix, a lattice upper triangular matrix and a lattice permutation matrix.

18. The signal detection system according to claim 17, wherein the channel matrix preprocessing submodule further comprises a LR domain search upper boundary and lower boundary determination unit configured to obtain a LR domain search boundary in the following manner:
    for the LR domain search upper boundary of a $l^{th}$ search layer of a $n^{th}$ subcarrier:

$$z_{l,max}{}^n = \max(\Omega) \cdot \Sigma((\underline{T}^n)^{-1}[l])_+ + \min(\Omega) \cdot \Sigma((\underline{T}^n)^{-1}[l])_-;$$

for the LR domain search lower boundary of the th search layer of the $n^{th}$ subcarrier:
$$z_{l,min}{}^n = \min(\Omega) \cdot \Sigma((\underline{T}^n)^{-1}[l])_+ + \max(\Omega) \cdot \Sigma((\underline{T}^n)^{-1}[l])_-;$$
    wherein D is a domain of a constellation element of the $l^{th}$ search layer; matrix $(\underline{T}^n)^{-1}$ is an inverse matrix of the lattice permutation matrix obtained from the LLL lattice reduction; $(\underline{T}^n)^{-1}[l]$ is a $l^{th}$ row of the matrix $(\underline{T}^n)^{-1}$; $((\underline{T}^n)^{-1}[l])_+$ is a positive element in the $l^{th}$ row of the matrix $(\underline{T}^n)^{-1}$; and $((\underline{T}^n)^{-1}[l])$ is a negative element in the $l^{th}$ row of the matrix $(\underline{T}^n)^{-1}$.

19. The signal detection system according to claim 16, wherein the K-best search submodule is configured to determine the global dynamic K-value corresponding to each search layer of each subcarrier according to any of the following steps or a combination of multiple steps:
    (1) increasing the global dynamic K-value corresponding to the search layer of the subcarrier with poor channel conditions;
    (2) assigning a weight to the global dynamic K-value corresponding to each search layer of each subcarrier, wherein a larger weight is assigned to the global dynamic K-value corresponding to the search layer closer to an initial search layer; and
    (3) grouping the subcarriers, and determining the global dynamic K-value corresponding to each search layer of each subcarrier for the subcarriers in the group.

20. The signal detection system according to claim 18, wherein the K-best search submodule is configured to determine the global dynamic K-value corresponding to each search layer of each subcarrier according to one of the following steps or a combination of multiple steps:
    (1) increasing the global dynamic K-value corresponding to the search layer of the subcarrier with poor channel conditions;
    (2) assigning a weight to the global dynamic K-value corresponding to each search layer of each subcarrier, wherein a larger weight is assigned to the global dynamic K-value corresponding to the search layer closer to an initial search layer;
    (3) grouping the subcarriers, and determining the global dynamic K-value corresponding to each search layer of each subcarrier for the subcarriers in the group;
    (4) taking the global dynamic K-value corresponding to each search layer of each subcarrier as a positive integer positively related to a search range size of each search layer; and
    (5) segmenting the search range size of all search layers of each subcarrier, and assigning a corresponding global dynamic K-value to each segment of the search range size, so that a segment with a larger search range corresponds to a larger global dynamic K-value, wherein the search range size of each search layer is determined according to the following formula:

$$L_l{}^n = z_{l,max}{}^n - z_{l,min}{}^n + 1.$$

\* \* \* \* \*